US012676267B2

(12) United States Patent
Bhate et al.

(10) Patent No.: US 12,676,267 B2
(45) Date of Patent: Jul. 7, 2026

(54) CONTROL DEVICES HAVING INDEPENDENTLY SUSPENDED BUTTONS FOR CONTROLLED ACTUATION

(71) Applicant: Lutron Technology Company LLC, Coopersburg, PA (US)

(72) Inventors: Nikhil Vithal Bhate, East Norriton, PA (US); Rich Destremps, Allentown, PA (US); James Harrison, Bernville, PA (US); Jason Edward Jennings, Macungie, PA (US); Eric Jonathan Mace, Allentown, PA (US); Stephen Phillips, Bethlehem, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 18/442,313

(22) Filed: Feb. 15, 2024

(65) Prior Publication Data

US 2024/0222046 A1 Jul. 4, 2024

Related U.S. Application Data

(63) Continuation of application No. 17/980,636, filed on Nov. 4, 2022, now Pat. No. 11,935,709, which is a (Continued)

(51) Int. Cl.

*H01H 13/83* (2006.01)
*H01H 13/70* (2006.01)
*H01H 13/84* (2006.01)

(52) U.S. Cl.

CPC ............ *H01H 13/83* (2013.01); *H01H 13/70* (2013.01); *H01H 13/84* (2013.01); (Continued)

(58) Field of Classification Search

CPC ..... H01H 2223/0345; H01H 2227/018; H01H 2227/026; H01H 2229/022; (Continued)

(56) References Cited

U.S. PATENT DOCUMENTS

| | | | |
|---|---|---|---|
| 4,192,976 | A | 3/1980 | Scott et al. |
| 4,246,494 | A | 1/1981 | Foreman et al. |

(Continued)

FOREIGN PATENT DOCUMENTS

| | | | |
|---|---|---|---|
| CN | 102339680 | A | 2/2012 |
| CN | 202549668 | U | 11/2012 |

(Continued)

OTHER PUBLICATIONS

HomeWorkSQS, "Wired International See Touch Keypads", 369607d, product specifications, Apr. 9, 2014, pp. 1-8.

(Continued)

*Primary Examiner* — Anthony R Jimenez

(74) *Attorney, Agent, or Firm* — Michael S. Czarnecki; Glen R. Farbanish; Philip N. Smith

(57) ABSTRACT

A control device includes a button assembly having one or more buttons and a button carrier that includes a plurality of resilient, independently deflectable spring arms. The control device may be configured as a wall-mounted keypad to control a load control device, or as a thermostat to control a temperature regulation appliance. The button carrier may be configured to prevent interference between the buttons during operation of the control device. The button assembly may be captured between a faceplate of the control device and a housing that is attached to a rear side of the faceplate. The control device may include one or more button retainers that are attached to the buttons and that are configured to align respective outer surfaces of the buttons relative to each
(Continued)

other, and relative to the faceplate of the control device, when the buttons are in respective rest positions.

19 Claims, 18 Drawing Sheets

Related U.S. Application Data continuation of application No. 17/403,509, filed on Aug. 16, 2021, now Pat. No. 11,495,422, which is a continuation of application No. 16/223,507, filed on Dec. 18, 2018, now Pat. No. 11,094,482, which is a continuation of application No. 15/134,299, filed on Apr. 20, 2016, now Pat. No. 10,181,385.

(60) Provisional application No. 62/150,227, filed on Apr. 20, 2015.

(52) U.S. Cl.
CPC . *H01H 2209/006* (2013.01); *H01H 2215/006* (2013.01); *H01H 2215/012* (2013.01); *H01H 2215/018* (2013.01); *H01H 2219/002* (2013.01); *H01H 2219/04* (2013.01); *H01H 2219/06* (2013.01); *H01H 2219/062* (2013.01); *H01H 2221/05* (2013.01); *H01H 2223/0345* (2013.01); *H01H 2227/018* (2013.01); *H01H 2227/026* (2013.01); *H01H 2229/022* (2013.01); *H01H 2231/052* (2013.01); *H01H 2233/04* (2013.01); *H01H 2235/018* (2013.01)

(58) Field of Classification Search
CPC ......... H01H 2231/052; H01H 2233/04; H01H 2235/018; H01H 2003/12; H01H 23/00; H01H 23/02; H01H 23/04; H01H 23/06; H01H 2209/006; H01H 2215/006; H01H 2215/012; H01H 2215/018; H01H 2219/00; H01H 2219/002; H01H 2219/04; H01H 2219/06; H01H 2219/062; H01H 2219/036; H01H 2219/037; H01H 2219/038; H01H 2219/039; H01H 2219/014; H01H 2219/018; H01H 2221/05; H01H 9/26; H01H 13/72; H01H 13/76; H01H 13/83; H01H 13/70; H01H 13/84; H01H 13/00; H01H 13/50
USPC .......................................................... 200/5 A
See application file for complete search history.

(56) References Cited

U.S. PATENT DOCUMENTS

| | | | | |
|---|---|---|---|---|
| 4,262,182 | A | 4/1981 | Basler et al. | |
| 4,315,114 | A | 2/1982 | Monti, Jr. | |
| 4,678,880 | A | 7/1987 | Koizumi et al. | |
| 4,803,380 | A | 2/1989 | Jacoby et al. | |
| 4,835,343 | A | 5/1989 | Graef et al. | |
| 4,924,349 | A | 5/1990 | Buehler et al. | |
| 5,237,327 | A | 8/1993 | Saitoh et al. | |
| 5,568,367 | A | 10/1996 | Park | |
| 5,847,336 | A | 12/1998 | Thornton | |
| 6,027,267 | A | 2/2000 | Yokobori | |
| 6,803,728 | B2 | 10/2004 | Balasubramaniam et al. | |
| 6,993,289 | B2 | 1/2006 | Janik | |
| 7,038,152 | B2 | 5/2006 | Watanabe | |
| 7,253,369 | B2 | 8/2007 | Fu et al. | |
| 7,361,853 | B2 | 4/2008 | Clegg et al. | |
| 7,411,142 | B2 | 8/2008 | Jung et al. | |
| 7,414,210 | B2 | 8/2008 | Clegg et al. | |
| 7,432,460 | B2 | 10/2008 | Clegg et al. | |
| 7,432,463 | B2 | 10/2008 | Clegg et al. | |
| 7,641,491 | B2 | 1/2010 | Altonen et al. | |
| 7,683,279 | B2 | 3/2010 | Kim | |
| 7,796,057 | B2 | 9/2010 | Swatsky | |
| 7,817,136 | B2 | 10/2010 | Shaft et al. | |
| 7,896,674 | B2 | 3/2011 | Altonen et al. | |
| 7,910,849 | B2 | 3/2011 | Hibshman et al. | |
| 8,077,058 | B2 | 12/2011 | Swatsky et al. | |
| 8,237,069 | B2 | 8/2012 | GaleWyrick et al. | |
| 8,526,161 | B2 | 9/2013 | Yu et al. | |
| 8,612,856 | B2 | 12/2013 | Hotelling et al. | |
| 8,754,816 | B2 | 6/2014 | Feldstein et al. | |
| 9,699,870 | B2 * | 7/2017 | Spira | H05B 45/10 |
| 9,763,302 | B2 | 9/2017 | McDonald et al. | |
| 9,911,372 | B2 | 3/2018 | Dimberg et al. | |
| 11,502,461 | B1 * | 11/2022 | King | H01H 47/00 |
| 2001/0048379 | A1 | 12/2001 | Kaikuranta et al. | |
| 2002/0034070 | A1 * | 3/2002 | Kumagai | H01H 13/702 362/311.04 |
| 2005/0000789 | A1 | 1/2005 | Yoneyama | |
| 2005/0073826 | A1 | 4/2005 | Kuo | |
| 2007/0296702 | A1 | 12/2007 | Strawn et al. | |
| 2008/0150767 | A1 | 6/2008 | Lawton et al. | |
| 2009/0058118 | A1 | 3/2009 | Hein et al. | |
| 2009/0128496 | A1 | 5/2009 | Huang et al. | |
| 2010/0044203 | A1 | 2/2010 | Huang et al. | |
| 2010/0108486 | A1 | 5/2010 | Yoshida | |
| 2010/0270138 | A1 | 10/2010 | Yamanaka | |
| 2011/0024277 | A1 | 2/2011 | Chen et al. | |
| 2011/0181446 | A1 | 7/2011 | O'Donnell | |
| 2011/0240453 | A1 | 10/2011 | Shu | |
| 2011/0272262 | A1 | 11/2011 | Chen | |
| 2011/0290628 | A1 | 12/2011 | Tsai | |
| 2012/0061118 | A1 | 3/2012 | Mao et al. | |
| 2012/0318655 | A1 | 12/2012 | Huang | |
| 2014/0001977 | A1 | 1/2014 | Zacharchuk et al. | |
| 2014/0268628 | A1 | 9/2014 | Mann et al. | |
| 2015/0021151 | A1 | 1/2015 | Chen | |
| 2016/0307714 | A1 * | 10/2016 | Bhate | H01H 13/70 |
| 2017/0347420 | A1 | 11/2017 | McDonald et al. | |

FOREIGN PATENT DOCUMENTS

| | | | |
|---|---|---|---|
| CN | 102842452 | A | 12/2012 |
| CN | 102856104 | A | 1/2013 |
| CN | 103367001 | A | 10/2013 |
| CN | 203787322 | U | 8/2014 |
| CN | 204117910 | U | 1/2015 |
| EP | 2141716 | A1 | 1/2010 |
| EP | 3286775 | A2 | 2/2018 |
| JP | 2000011800 | A | 1/2000 |

OTHER PUBLICATIONS

InternationalSeeTouchQS, "Wallstation Installation Guide", Lutron, Jun. 2010, pp. 1-16.

* cited by examiner

CONTROL DEVICES HAVING INDEPENDENTLY SUSPENDED BUTTONS FOR CONTROLLED ACTUATION

CROSS-REFERENCE TO RELATED APPLICATIONS

This application is a continuation of U.S. patent application Ser. No. 17/980,636, filed Nov. 4, 2022; which is a continuation of U.S. patent application Ser. No. 17/403,509, filed Aug. 16, 2021, now U.S. Pat. No. 11,495,422 issued Nov. 8, 2022; which is a continuation of U.S. patent application Ser. No. 16/223,507 filed Dec. 18, 2018, now U.S. Pat. No. 11,094,482 issued Aug. 17, 2021; which is a continuation of U.S. patent application Ser. No. 15/134,299, filed Apr. 20, 2016 now U.S. Pat. No. 10,181,385 issued Jan. 15, 2019, which claims priority to U.S. Provisional Patent Application No. 62/150,227, filed Apr. 20, 2015, all of which are incorporated herein by reference in their respective entireties.

BACKGROUND

Load control devices may be used to control the amount of power delivered from a power source, such as an alternating-current (AC) power source, to one or more electrical loads. An example of such a load control device is a wall-mounted dimmer switch.

Home automation systems, which have become increasing popular, may be used by homeowners to integrate and/or control multiple electrical and/or electronic devices in their homes. For example, a homeowner may connect devices such as appliances, lights, blinds, thermostats, cable or satellite boxes, security systems, telecommunication systems, and the like to each other via a wireless network.

The homeowner may control such devices using a central (e.g., automated) controller, a dedicated remote control device (e.g., a wall-mounted keypad), a user interface provided via a phone, tablet, computer, or other device that is directly connected to a home network or remotely connected via the Internet, and so on. These devices may communicate with each other and/or a control device, for example to improve efficiency, convenience, and/or usability of the devices.

However, known dedicated remote control devices, such as wall-mounted keypads, for example, typically exhibit one or more undesirable characteristics. For example, in wall-mounted keypads that include physical buttons, the gaps between adjacent buttons may be undesirably large, which may detract from the aesthetic appearance of the keypad. And in keypads with tighter button spacing tolerances, the buttons may mechanically interfere with one another during actuation, such that the tactile feel that a user of the keypad experiences may be degraded.

SUMMARY

As described herein, an example control device may be configured for use with a load control system that may include, for example, one or more remote control devices and/or one or more load control devices, such as dimming modules. For example, the control device may be configured as a wall-mounted keypad. The control device may include a faceplate, a button assembly, a control module, and an adapter that is configured to be mounted to a structure. The faceplate and the adapter may be configured such that the faceplate is removably attachable to the adapter. The faceplate may define an opening that extends therethrough and that is configured to at least partially receive the buttons therein. The button assembly may include one or more buttons and a button carrier to which the buttons are attached.

The control module may be configured to be attached to a rear side of the faceplate, such that the button assembly may be captured between the faceplate and the control module. When the control module is attached to the faceplate the button carrier, and thus the buttons, may move side to side and/or up and down within the opening of the faceplate. Additionally, when the button assembly is captured between the control module and the faceplate, the button carrier may abut a rear surface of the faceplate such that the button carrier may be constrained from moving along a direction that extends perpendicular to front and rear surfaces of the faceplate.

The button carrier may include a plurality of resilient, independently deflectable spring arms. The buttons may be attached to the button carrier such that the buttons are suspended by corresponding ones of the deflectable spring arms. The spring arms of the button carrier may be configured to prevent interference between the buttons during independent operation of a single button, and during simultaneous operation of multiple buttons.

The control device may include one or more lighting elements that are configured to illuminate inner surfaces of the buttons. The control device may include a light guide assembly that is configured to disperse light emitted by the one or more lighting elements. The light guide assembly may include one or more electrical shorting pads that are attached thereto. The control device may include a light blocker that is configured to block at least a portion of the light emitted by the one or more lighting elements.

The control device may include one or more resilient, deflectable return members that are configured to bias the buttons from depressed positions to rest positions. The control device may include a printed circuit board (PCB) that has one or more open circuit pads thereon. Each open circuit pad may correspond to a respective electrical shorting pad, and may further correspond to a command for execution by an electrical device, such as a load control device (e.g., a dimming module) that is controlled by the control device, for example when the control device is configured to operate as a remote control or keypad in a load control system.

A second example control device may be configured for use with one or more temperature regulation appliances, such as a furnace, a heat pump, an air conditioning unit, a heating, ventilation, and air-conditioning (HVAC) system, or the like. The second control device may be configured as a thermostat. The second control device may include a faceplate, a button assembly, and a housing that is configured to be mounted to a structure. The faceplate and the housing may be configured such that the faceplate is removably attachable to the housing. The faceplate may define an opening that extends therethrough and that is configured to at least partially receive the buttons therein. The button assembly may include one or more buttons and a button carrier to which the buttons are attached. The button carrier may be configured to prevent interference between the buttons during independent operation of a single button, and during simultaneous operation of multiple buttons.

The button assembly may be captured between the faceplate and the housing. When the button assembly is captured between the faceplate and the housing the button carrier, and thus the buttons, may move side to side and/or up and down within the opening of the faceplate. Additionally, when the button assembly is captured between the faceplate and the housing, the button carrier may abut a rear surface of the faceplate such that the button carrier may be constrained from moving along a direction that extends perpendicular to front and rear surfaces of the faceplate.

The second control device may include one or more button retainers that are attached to the buttons and that are configured to align respective outer surfaces of the buttons relative to each other, and relative to the outer surface of the faceplate, when the buttons are in respective rest positions.

The second control device may include one or more lighting elements that are configured to illuminate inner surfaces of the buttons. The second control device may include a light guide assembly that is configured to disperse light emitted by the one or more lighting elements. The light guide assembly may disperse light emitted by the one or more lighting elements, and may include one or more electrical shorting pads that are attached thereto.

The second control device may include one or more resilient, deflectable return members that are configured to bias the buttons from depressed positions to rest positions. The second control device may include a temperature sensor, and may include a display screen that is configured to display indicia related to a temperature regulation appliance. The second control device may include an occupancy sensing circuit. The second control device may include a printed circuit board (PCB) that has one or more open circuit pads thereon. Each open circuit pad may correspond to a respective electrical shorting pads, and may further correspond to a command for execution by a temperature regulation appliance that is controlled by the second control device.

DETAILED DESCRIPTION

Figure 1B:
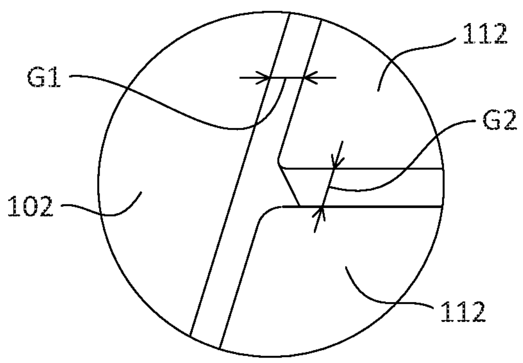
FIG. 1B is a zoomed in view of a portion of the example control device illustrated in FIG. 1A.

FIGS. 1A-1B and 2A-2C depict an example control device that is configured for use in a load control system for controlling one or more load control devices, such as dimming modules, and/or one or more electrical loads, such as lighting loads, motorized window treatments, or the like. As shown, the example control device is configured as a wall-mounted keypad 100. The keypad 100 may include a faceplate 102, a button assembly 110, a control module 180, and an adapter 190 that is configured to be mounted to a structure. The control module 180 may be configured to be attached to the faceplate 102 such that the button assembly 110 is captured by, and floats between, the faceplate 102 and the control module 180. The illustrated keypad 100 may be configured to control a load control device, such as a load control device configured to control an amount of power delivered to one or more electrical loads (e.g., one or more lighting loads) from a power source (e.g., an alternating-current (AC) power source).

As shown, the faceplate 102 defines a front surface 101 that faces outward relative to a structure to which the keypad 100 is installed and an opposed rear surface 103 that faces inward relative to the structure. The front surface 101 may be referred to as an outer surface of the faceplate 102 and the rear surface 103 may be referred to as an inner surface of the faceplate 102. The faceplate 102 may define an opening 104 that extends therethrough and that is configured to at least partially receive the buttons 112 therein. For example, in accordance with the illustrated keypad 100, the opening 104 may be sized to receive the buttons 112 such that a gap G1 is defined between inner surfaces 105 of the opening 104 and corresponding outer peripheral surfaces 112*c* of the buttons 112. The width of the gap G1 may be configured in accordance with a material from which the buttons 112 are made. Example gap width ranges for a variety of example button materials are listed in Table 1 below.

TABLE 1

| Button Material | Gap Width (inches) |
|---|---|
| Plastic | 0.001-0.011 |
| Metal | 0.002-0.010 |
| Glass | 0.001-0.021 |

Figure 3A:
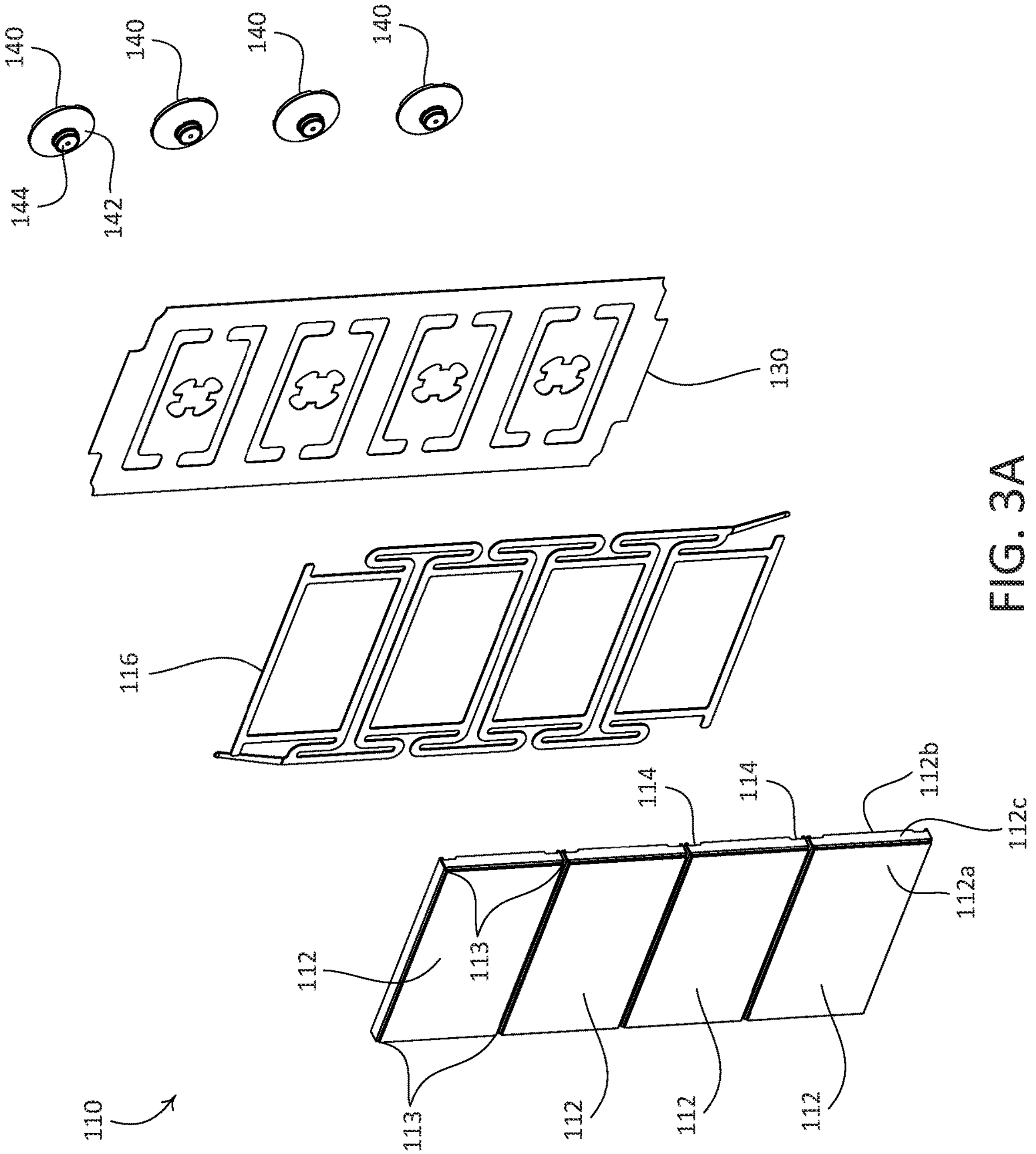
FIG. 3A is a front-facing exploded view of a button assembly of the example control device illustrated in FIG. 1A.
Figure 3B:
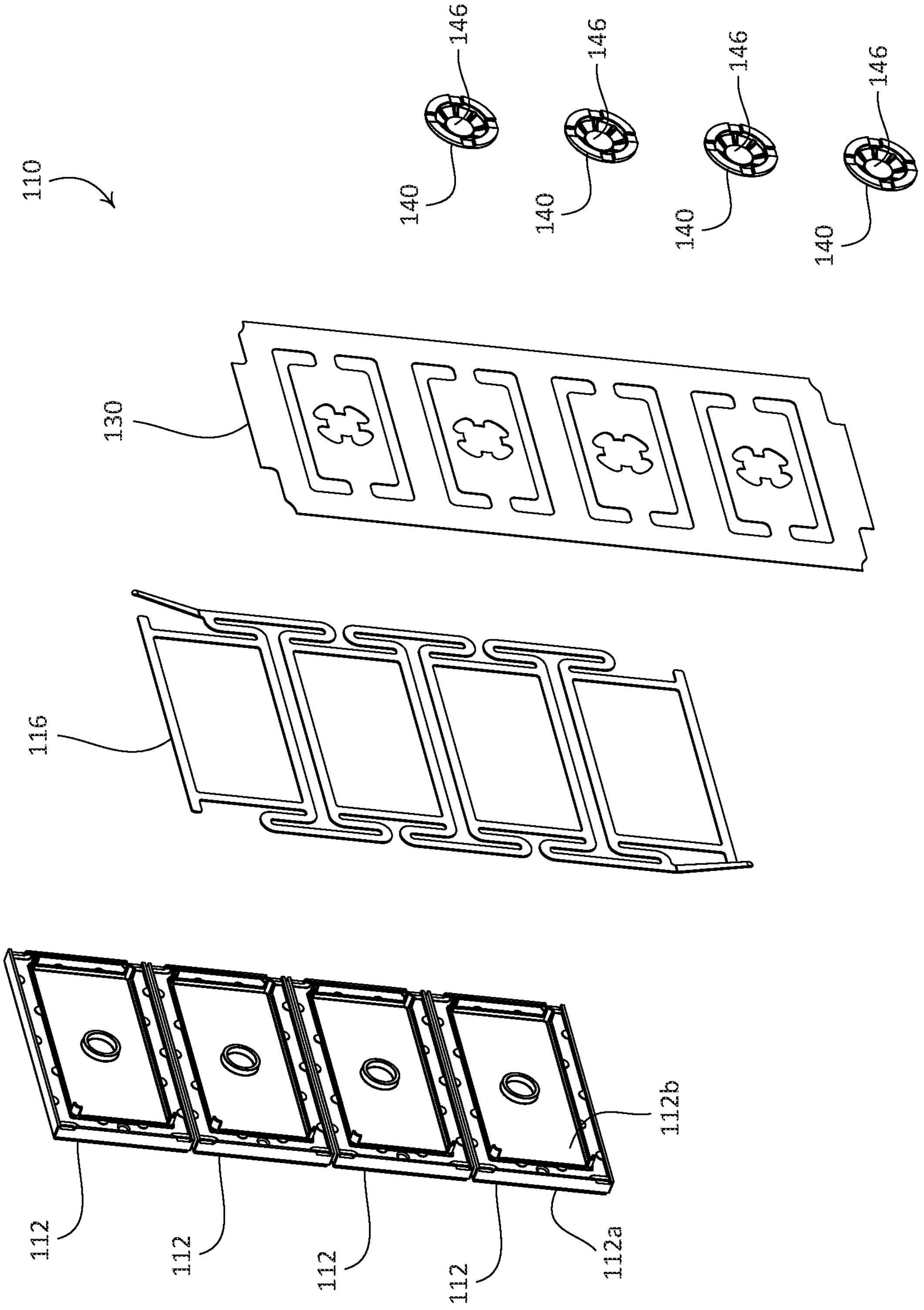
FIG. 3B is a rear-facing exploded view of the button assembly illustrated in FIG. 3A.

Referring additionally to FIGS. 3A-3B, the button assembly 110 may include one or more buttons 112. For example, in accordance with the illustrated keypad 100, the button assembly 110 may include four buttons 112 that are rectangular in shape and are of the same size, and that are oriented in a vertical array relative to one another. As shown, each button 112 defines four corners 113 along an outer perimeter of the button 112, an outward-facing outer surface 112*a*, an opposed, inward-facing inner surface 112*b*, and respective outer peripheral surfaces 112*c*. However, it should be appreciated that the keypad 100 is not limited to buttons having the illustrated button geometries. For example, the keypad 100 may alternatively include more or fewer buttons having the same or different geometries and/or sizes. The buttons 112 may be made of any suitable material, for example plastic, glass, metal, or the like. Alternatively, the buttons 112 may be made of a mix of materials. For example, each button 112 may include a body that is made of a first material (e.g., plastic), and may include a veneer that is made of a different material (e.g., metal) and that is attached to the body of the button 112. The faceplate 102 may be made of the same material, or using the same mix of materials, as the buttons 112. Alternatively, the faceplate 102 and the buttons 112 may be made of different materials.

The button assembly 110 may include a button carrier 116 that is configured to support (e.g., carry) the one or more buttons 112. As shown, each button 112 defines four corners 113 along an outer perimeter of the button 112. Each button 112 may be configured to be attached (e.g., glued) to the button carrier 116. For example, each button 112 may define one or more notches 114 that are configured to receive a corresponding portion of the button carrier 116. As shown, each button 112 defines four notches 114, including one notch 114 at each corner 113 of the button 112.

Figure 4:
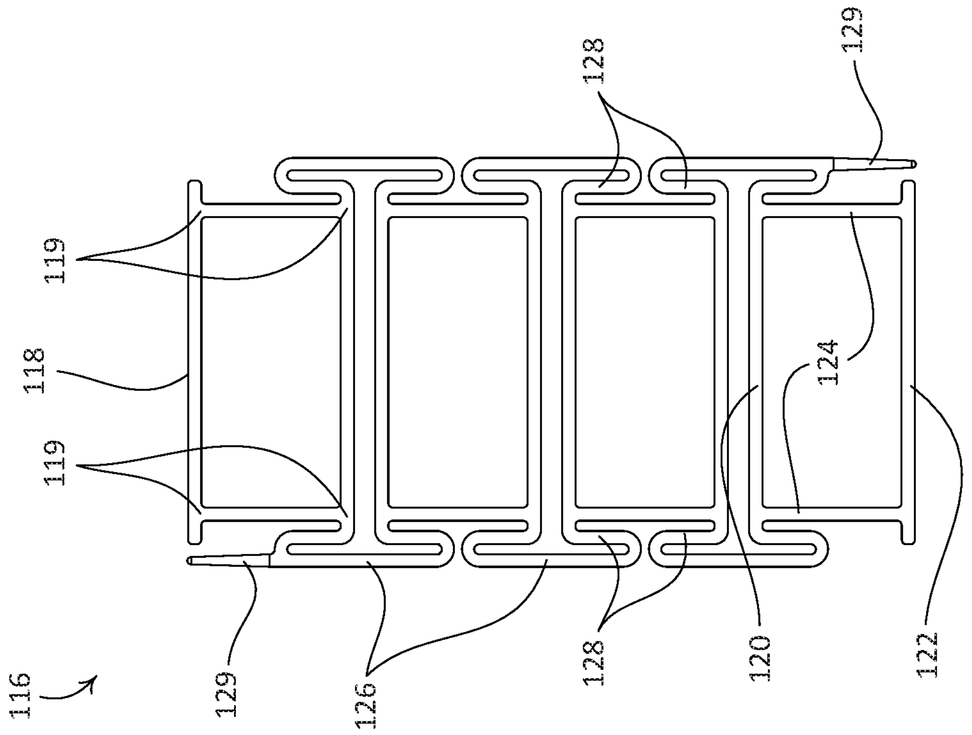
FIG. 4 is a front view of a button carrier component of the example control device illustrated in FIG. 1A.

As shown in FIG. 4, the button carrier 116 may define one or more button frames 118. Each button frame 118 may be configured to support a respective one of the buttons 112. As shown, each button frame 118 may be defined by an upper frame member 120, a lower frame member 122, and opposed side frame members 124 that extend between the upper and lower frame members 120, 122. Each button frame 118 may be configured such that a corresponding button 112 may be attached to the button frame 118. For example, as shown, the upper and lower frame members 120, 122 are spaced apart such that the when a button 112 is attached to the button frame 118, the upper frame member 120 is received in the notches 114 at the upper corners 113 of the button 112, and the lower frame member 122 is received in the notches 114 at the lower corners 113 of the button 112. The buttons 112 may be attached to respective ones of the button frames 118, for example by gluing the buttons 112 to the button frames 118. The upper and lower frame members 120, 122 of adjacent button frames 118 may be spaced apart from each other such that, when respective buttons 112 are attached to the adjacent button frames 118, the facing outer peripheral surfaces 112*c* of adjacent buttons 112 are spaced apart from each other by a gap G2. The width of the gap G2 may be configured in accordance with the number of buttons 112 that are supported by the button carrier 116, and may be substantially the same as (e.g., equal to) or different from the width of the gap G1 between the buttons 112 and the opening 104 of the faceplate 102. Example gap width ranges for a variety of example button configurations are listed in Table 2 below. As shown, the button carrier 116 is configured to support four buttons 112 in a linear array that extends vertically.

TABLE 2

| Number of Buttons | Gap Width (inches) |
|---|---|
| 4 | 0.005-0.011 |
| 3 | 0.005-0.013 |
| 2 | 0.005-0.015 |

The button carrier 116 may further define one or more support sections 126 that are configured to abut the rear surface 103 of the faceplate 102 when the keypad 100 is in an assembled configuration (e.g., with the control module 180 attached to the faceplate 102). In accordance with the illustrated button carrier 116, a first plurality of support sections 126 may extend along a first side of the button carrier 116, and a second plurality of support sections 126 may extend along an opposed second side of the button carrier 116. The button carrier 116 may be floatingly captured between the faceplate 102 and the control module 180, for example such that the button assembly 110 is supported by, but is not physically attached, to the faceplate 102 and the control module 180. This may allow a first button assembly of the keypad 100 to be swapped out for another button assembly that may, for example, have a different button configuration.

The button carrier 116 may further include a plurality of resilient, independently deflectable spring arms 128 that connect the button frames 118 to the support sections 126. As shown, each button frame 118 may be supported by spring arms 128 at one or more respective corners 119 of the button frame 118, such that one or more corners 113 of each button 112 are suspended by a corresponding spring arm 128. The spring arms 128 may be configured to allow the button frames 118 to deflect relative to the support sections 126, and to allow the button frames 118 to deflect independently relative to each other. Additionally, the spring arms 128 may enable the entirety of a button 112 to move inward as the button 112 is depressed, which may provide a more satisfying tactile feel to operation of the buttons 112 by a user of the keypad 100, for example, in comparison to known keypads having buttons that are pivotally supported (e.g., along respective edges of the buttons).

The button carrier 116 may define one or more electrostatic discharge (ESD) clips 129 that may be configured to provide a path to ground from the buttons 112 when the keypad 100 is installed and is electrically connected to earth ground. As shown, the button carrier 116 may include two ESD clips 129 that extend from support sections 126 at opposed corners of the button carrier 116.

The button carrier 116 may operate to maintain the spacing of the buttons 112 relative to each other, and may operate to maintain the spacing of the buttons 112 relative to the opening 104 of the faceplate 102. This may provide uniform, controlled deflection of each button 112, for example as the buttons 112 are operated from rest (e.g., default, non-pressed) positions to depressed positions. The button carrier 116 may constrain the buttons 112 during operation, such that the buttons 112 do not interfere with each other, for instance by making contact with one another.

For example, when a single button 112 is depressed corresponding spring arms 128 supporting the button 112 may deflect, and may operate to maintain the spacing between the depressed button 112 and one or more adjacent buttons 112 and/or the inner surfaces 105 of the opening 104 of the faceplate 102. In another example, when multiple buttons 112 are depressed simultaneously respective spring arms 128 supporting the buttons 112 may deflect, and may operate to maintain the spacing between the buttons 112 and/or the inner surfaces 105 of the opening 104 of the faceplate 102.

Additionally, the button carrier 116 may operate to align respective outer surfaces 112*a* of the buttons 112 relative one another and relative to the front surface 101 of the faceplate 102, for example such that the outer surfaces 112*a* of the buttons 112 are substantially coplanar with the front surface 101 of the faceplate 102 when the support sections 126 of the button carrier 116 abut the rear surface 103 of the faceplate 102 and the buttons 112 are in respective rest positions.

Figure 1A:
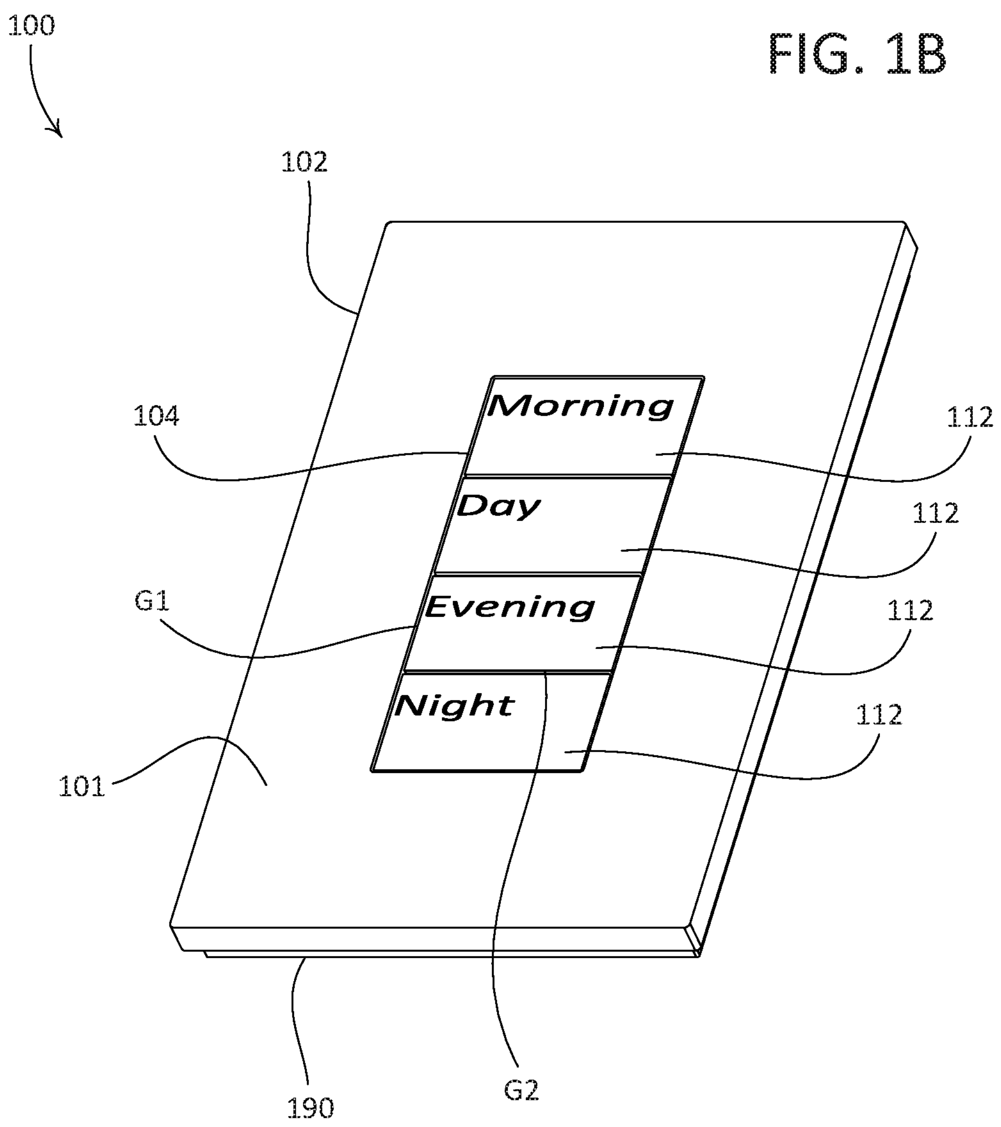
FIG. 1A is a perspective view of an example control device, configured as a wall-mounted keypad, that may be used in a load control system for controlling the amount of power delivered to one or more electrical loads.
Figure 2A:
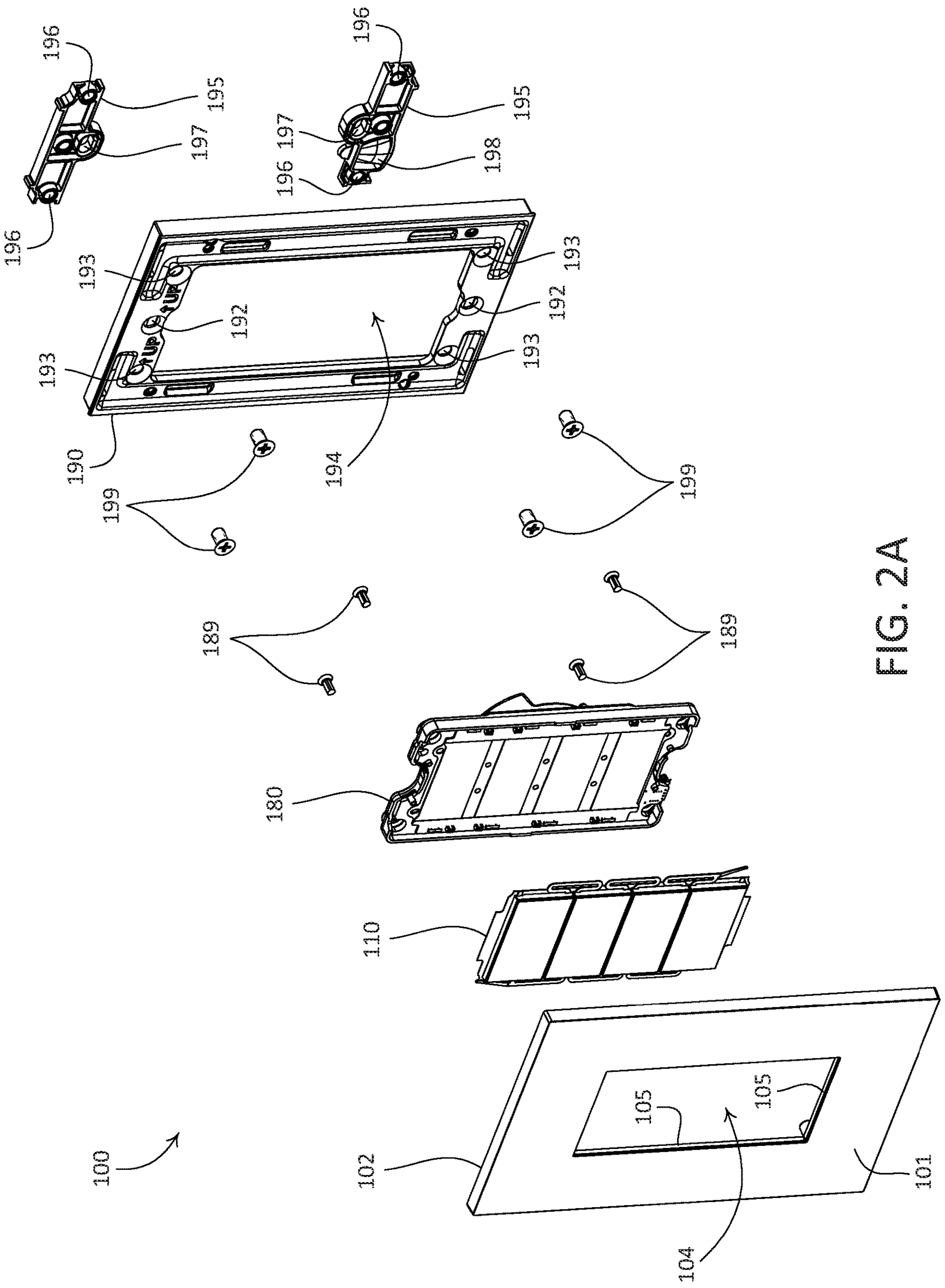
FIG. 2A is a front-facing exploded view of the example control device illustrated in FIG. 1A.
Figures 2B, 2C:
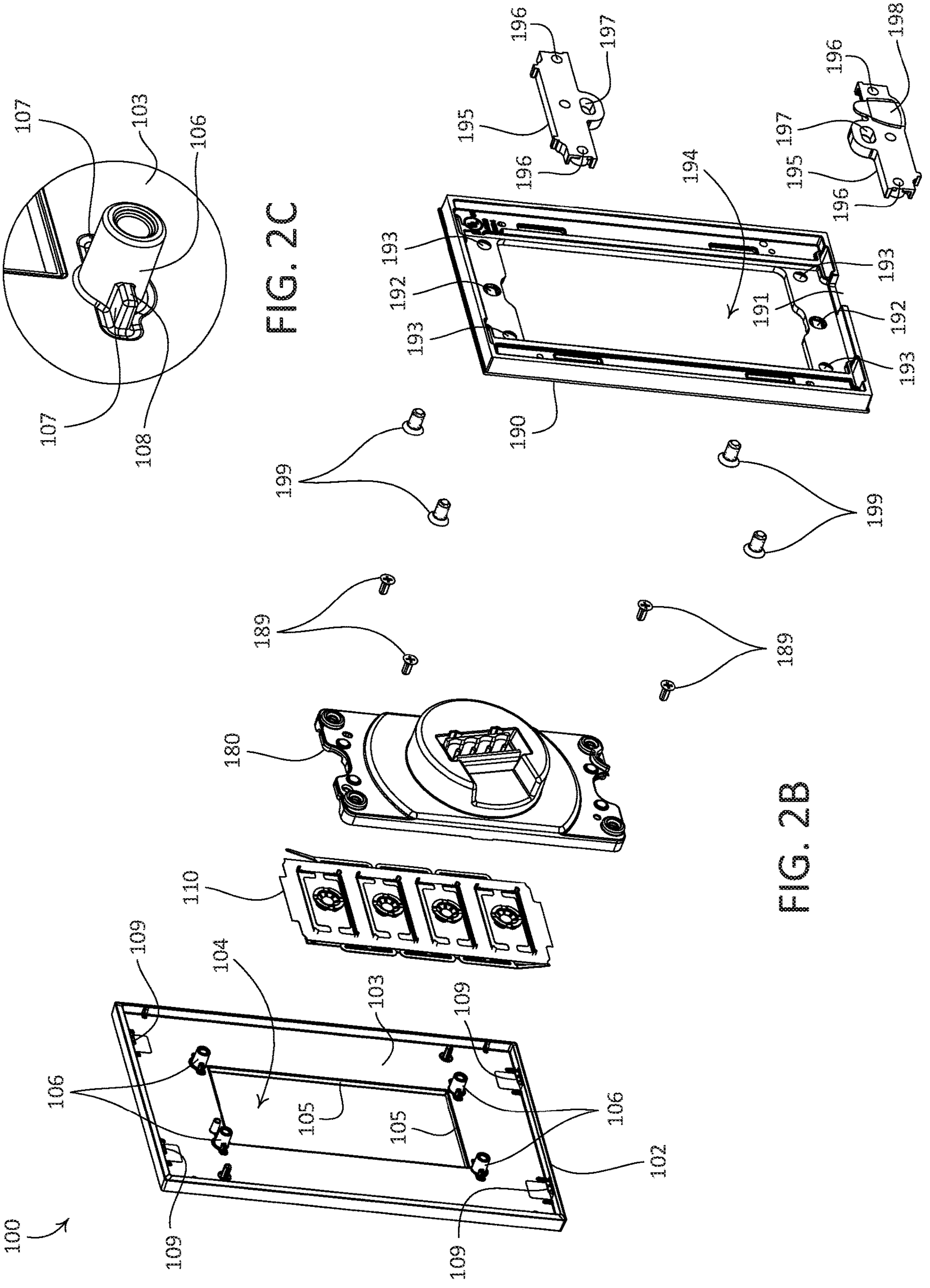
FIG. 2B is a rear-facing exploded view of the example control device illustrated in FIG. 1A.
FIG. 2C is a zoomed in view of a portion of a faceplate component of the example control device illustrated in FIG. 1A.

The buttons 112 may include indicia, such as text, icons, or the like (e.g., as shown in FIG. 1A). As shown, the indicia may be cut through the buttons 112. The indicia may be filled, for instance with a translucent or clear material. Alternatively, the indicia may be etched into surfaces (e.g., the outer surfaces 112*a* and/or the inner surfaces 112*b*) of the respective buttons 112, may be printed on the outer surfaces 112*a* of the buttons 112, or may be otherwise formed or displayed on the buttons 112. The indicia may be indicative of respective functions that are invoked by depressing the corresponding buttons 112 of the keypad 100.

Figure 6A:
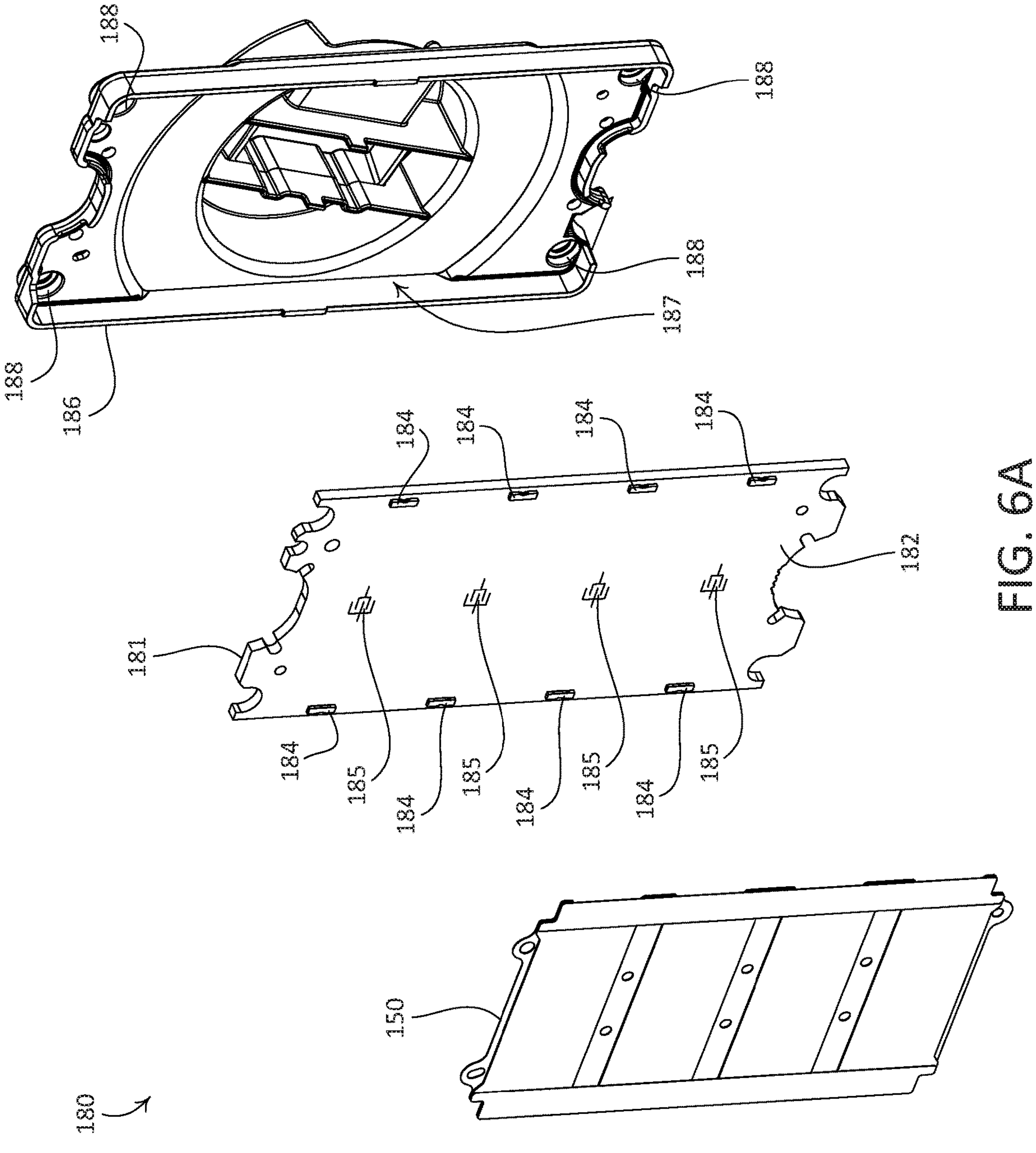
FIG. 6A is a front-facing exploded view of a control module of the example control device illustrated in FIG. 1A.
Figure 6B:
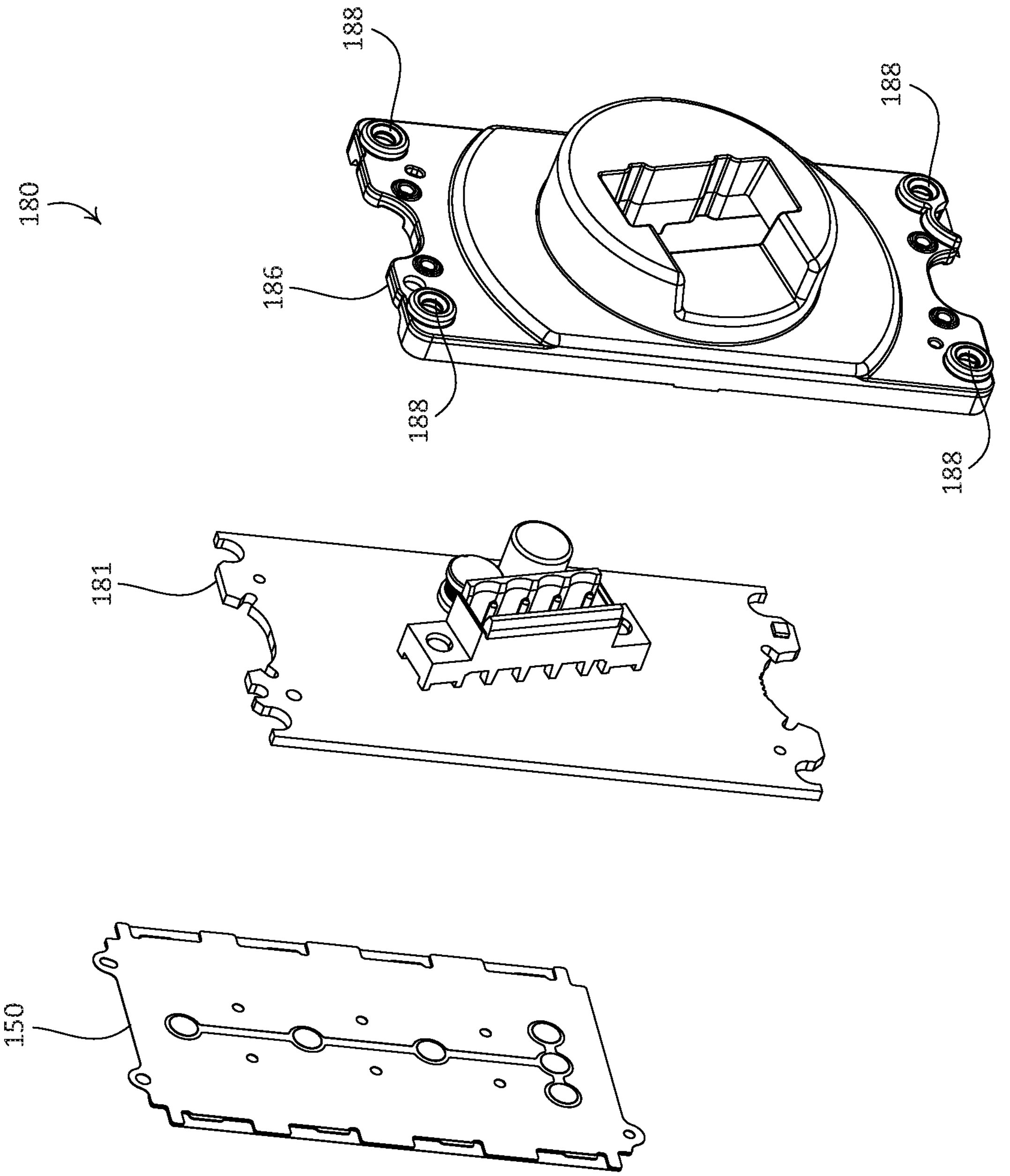
FIG. 6B is a rear-facing exploded view of the control module illustrated in FIG. 6A.

Referring now to FIGS. 6A-6B, the control module 180 may include a light guide assembly 150, a printed circuit board (PCB) 181, and a housing 186. The housing 186 may be configured to at least partially receive one or more components of the keypad 100. For example, as shown, the housing 186 defines a void 187 that is configured to receive the PCB 181 and the light guide assembly 150. The PCB 181 and the light guide assembly 150 may be configured to be secured to the housing 186. The housing 186 may be configured to at least partially receive respective portions of the button assembly 110 (e.g., the support sections 126 of the button carrier 116) when the control module 180 is attached to the faceplate 102, such that the button assembly 110 is not attached to the housing 186, but rather is floatingly supported by the housing 186, and thus is floatingly supported by the control module 180. The housing 186 may be made of any suitable material, such as plastic.

The keypad 100 may include one or more lighting elements (e.g., light sources) that are configured to illuminate respective interiors (e.g., the inner surfaces 112*b*) of the buttons 112, such that the indicia of the buttons 112 are backlit from within an interior of the keypad 100. For example, the keypad 100 may include a plurality of lighting elements, such as light emitting diodes (LEDs), that are disposed within the housing 186 of the keypad 100, behind the buttons 112, and that are configured to backlight the buttons 112. As shown, the keypad 100 includes eight LEDs 184 that are mounted to a front surface 182 of the PCB 181, and that are arranged in pairs of LEDs 184 that are disposed near opposed sides of each button 112. The LEDs 184 may be configured to emit light into opposed sides of the light guide assembly 150, for example to backlight the buttons 112.

It should be appreciated that the keypad 100 is not limited to the illustrated configuration of LEDs 184, which may be referred to as a backlighting configuration of the keypad 100. For example, in alternative backlighting configurations, the keypad 100 may include more or fewer LEDs, which may be positioned in one or more of the same or different positions relative to the light guide assembly 150. For instance, in an example alternative backlighting configuration, the keypad 100 may include four LEDs 184, with each LED 184 disposed near a side of a respective one of the buttons 112. It should further be appreciated that keypad 100 is not limited to LEDs 184 that are mounted to the front surface 182 of the PCB 181, and that one or more of the LEDs 184 may be otherwise mounted so as to backlight one or more of the buttons 112. Examples of button indicia and button backlighting systems are described in greater detail in commonly-assigned U.S. Provisional Patent Application No. 62/048,652, titled "Control Device Having Buttons With Metallic Surfaces And Backlit Indicia," and U.S. Provisional Patent Application No. 62/048,658, titled "Control Device Having Buttons With Multiple-Level Backlighting," the entire disclosures of which are incorporated herein by reference.

The keypad 100 may be configured to, in response to one or more buttons 112 being depressed, transmit one or more digital messages via a communication link to one or more external control devices of a load control system, such as system controllers, remote control devices, and/or load control devices (e.g., dimming modules), and/or to one or more electrical loads of the load control system. The one or more digital messages may include, for example, one or more commands for execution by the one or more external load control devices to control respective electrical loads (e.g., lighting loads). The communication link may comprise a wired communication link or a wireless communication link, such as a radio-frequency (RF) communication link. In accordance with an alternative configuration, the keypad 100 may further include an internal load control circuit (not shown) for controlling the power delivered to one or more electrical loads (e.g., lighting loads). Examples of load control systems having remote control devices, such as the keypad 100, are described in greater detail in commonly-assigned U.S. Pat. No. 6,803,728, issued Oct. 12, 2004, entitled "System For Control Of Devices," and U.S. Patent Application Publication No. 2014/0001977, published Jan. 2, 2014, entitled "Load Control System Having Independently-Controlled Units Responsive To A Broadcast Controller," the entire disclosures of which are incorporated herein by reference.

Figure 5:
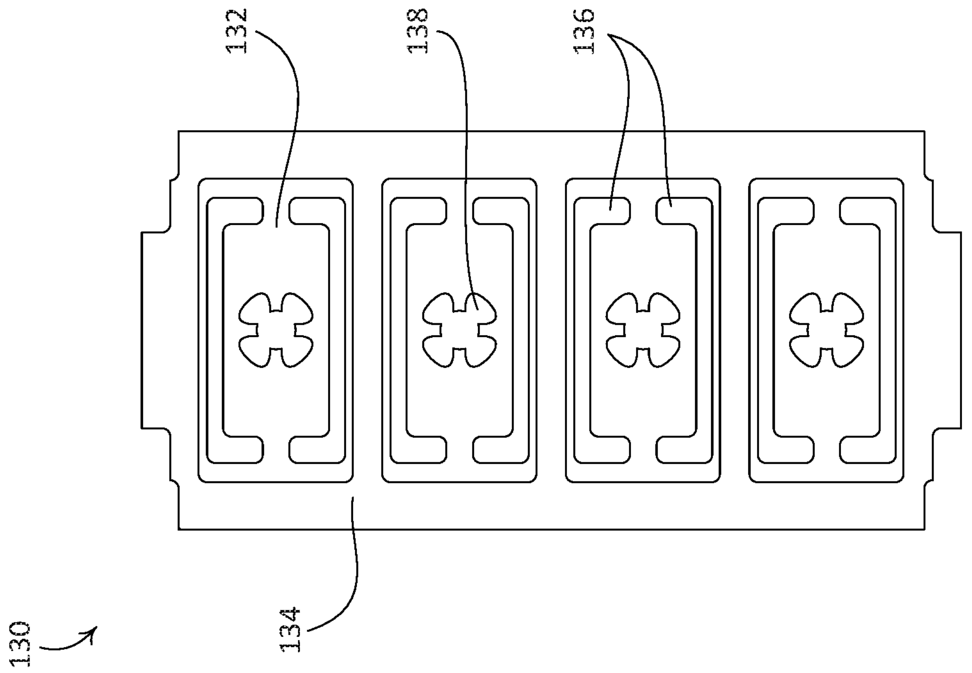
FIG. 5 is a front view of a light blocker component of the example control device illustrated in FIG. 1A.

Referring again to FIGS. 3A-3B and FIG. 5, the button assembly 110 may include a light blocker 130 and one or more return members 140. The light blocker 130 may be configured to block at least a portion of the light emitted by one or more of the LEDs 184. For example, the light blocker 130 may be configured to block light emitted from one or more of the LEDs 184 from leaking through one or more of the gaps G2 between the buttons 112. As shown, the light blocker 130 may include a plurality of translucent regions 132 that are configured to permit light emitted from one or more of the LEDs 184 to reach respective inner surfaces 112*b* of one or more of the buttons 112, and may further include an opaque region 134 that is configured to block light emitted from one or more of the LEDs 184 from illuminating one or more of the gaps G2 between the buttons 112. The light blocker 130 may further define a plurality of openings 136 that extend therethrough, and that are configured to receive portions of corresponding ones of the buttons 112 when the buttons 112 are depressed.

As shown, the button assembly 110 may include a plurality of return members 140, with each return member 140 corresponding to one of the buttons 112. Each return member 140 may be configured to bias a corresponding button 112 from a depressed position to the rest position, for example after the button 112 is depressed and pressure is subsequently released from the button 112. The return members 140 may be made of a deflectable, resilient material, such as rubber or the like. As shown, each return member 140 includes a collapsible, resilient contact dome 142 that may be configured to abut the light guide assembly 150 when the keypad 100 is in an assembled configuration. Each contact dome 142 may correspond to one of the buttons 112, and may be configured to collapse when the corresponding button 112 is operated to a depressed position (e.g., by a user applying pressure to the button 112), and to bias the button 112 from the depressed position back to the rest position when operation of the button 112 ceases, for example after the button 112 is depressed and pressure is subsequently released from the button 112. Each contact dome 142 may define an actuator 144 that is configured to abut the inner surface 112*b* of a corresponding one of the buttons 112 when the corresponding button 112 is in the rest position. The actuator 144 of each return member 140 may define a post 146 (e.g., as show in FIG. 3B) that extends into a convex interior portion of each contact dome 142. As shown, the light blocker 130 may define a plurality of openings 138 that extend therethrough. Each opening 138 may be configured to receive the actuator 144 of a corresponding one of the return members 140, which may align the return member 140 relative to the light guide assembly 150 and/or to a corresponding one of the buttons 112.

Figure 7:
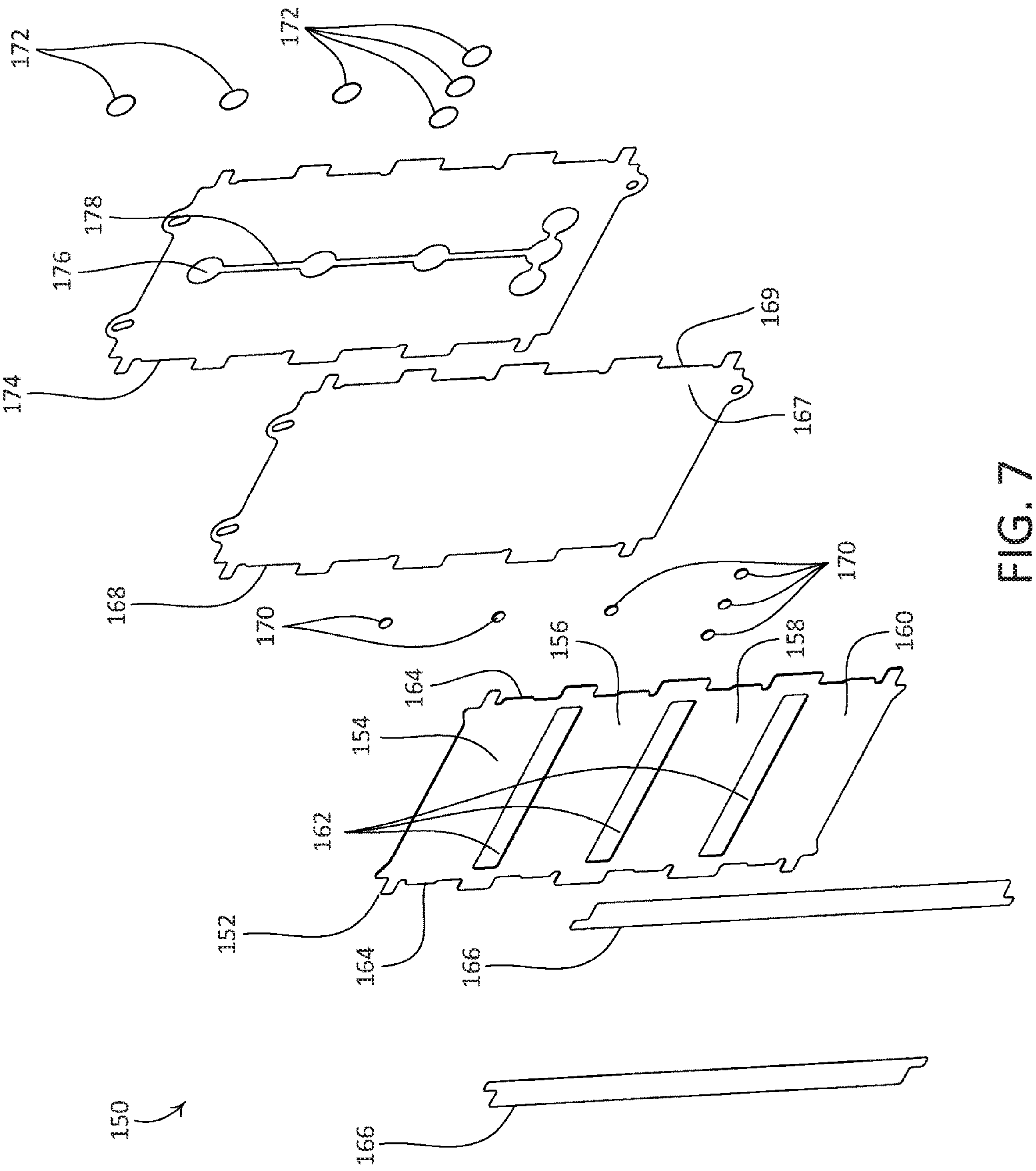
FIG. 7 is an exploded view of an example light guide assembly of the control module of the example control device illustrated in FIG. 1A.

Referring now to FIG. 7, the light guide assembly 150 may be configured to disperse light emitted by the plurality of LEDs 184. As shown, the light guide assembly 150 includes a light guide film layer 152. The light guide film layer 152 may define one or more regions that are configured to disperse light from corresponding ones of the plurality of LEDs 184. As shown, the light guide film layer 152 defines a first dispersion region 154 that is configured to disperse light emitted by a first opposed pair of LEDs 184 behind a first one of the buttons 112 (e.g., the uppermost button 112), a second dispersion region 156 that is configured to disperse light emitted by a second opposed pair of LEDs 184 behind a second one of the buttons 112 (e.g., the second to uppermost button 112), a third dispersion region 158 that is configured to disperse light emitted by a third opposed pair of LEDs 184 behind a third one of the buttons 112 (e.g., the second to lowermost button 112), and a fourth dispersion region 160 that is configured to disperse light emitted by a fourth opposed pair of LEDs 184 behind a fourth one of the buttons 112 (e.g., the lowermost button 112). As shown, the light guide film layer 152 defines a plurality of openings 162 that separate and partially define the first, second, third, and fourth dispersion regions 154, 156, 158, 160. For each of the first, second, third, and fourth dispersion regions 154, 156, 158, 160, the light guide film layer 152 defines an opposed pair of tabs 164 that are configured to receive light emitted from a corresponding pair of LEDs 184. When the keypad 100 is in an assembled configuration, the contact domes 142 of the return members 140 may abut the light guide film layer 152.

The light guide assembly 150 may further include one or more reflector strips 166 that are configured to reflect light emitted from the LEDs 184 back into the light guide film layer 152. As shown, the light guide assembly 150 includes a first reflector strip 166 that is disposed along a first side of the light guide film layer 152, and a second reflector strip 166 that is disposed along an opposed second side of the light guide film layer 152.

The light guide assembly 150 may further include a carrier layer 168 that is disposed adjacent to the light guide film layer 152 and that may be attached to the light guide film layer 152. The carrier layer 168 may define a front surface 167 and an opposed rear surface 169. The light guide assembly 150 may further include one or more force concentrators 170 that are disposed between the carrier layer 168 and the light guide film layer 152. The force concentrators 170 may be attached to the front surface 167 of the carrier layer 168. Each force concentrator 170 may be aligned with a corresponding one of the buttons 112. The light guide assembly 150 may further include one or more electrical shorting pads 172 that may be attached to the rear surface 169 of the carrier layer 168, such that each electrical shorting pad 172 is aligned with a corresponding one of the force concentrators 170, and such that the electrical shorting pads 172 are aligned with corresponding ones of the buttons 112. As shown, the light guide assembly 150 includes a single force concentrator 170 and a single electrical shorting pad 172 for each of the top three buttons 112, and three force concentrators 170 and three electrical shorting pads 172 that correspond to the lowermost button 112. This may enable three separate commands to be associated with the lowermost button 112 (e.g., by pressing the lowermost buttons near the left side of the button 112, near the middle of the button 112, or near the right side of the button 112).

The light guide assembly 150 may further include a spacer layer 174 that may be attached to the rear surface 169 of the carrier layer 168. The spacer layer 174 may define one or more openings that are aligned with the electrical shorting pads 172. As shown, the spacer layer 174 defines a plurality of openings 176 that extend therethrough and that define respective diameters that are greater than that of corresponding ones of the electrical shorting pads 172. The openings 176 may be interconnected by respective slots 178 that extend through the spacer layer 174. The spacer layer 174 may operate to prevent the contact domes 142 of the return members 140 from remaining in partially collapsed positions after respective ones of the buttons 112 are depressed.

The PCB 181 may have one or more pairs of electrical contacts disposed thereon, for example on the front surface 182 of the PCB 181. For example, as shown, the PCB 181 may include four pairs of electrical contacts configured as open circuit pads 185. Each open circuit pad 185 may include, for example, a plurality of first electrical trace fingers and a plurality of second electrical trace fingers. The pluralities of first and second electrical trace fingers may be interleaved with respect to each other, such that a conductive element (e.g., an electrical shorting pad 172) that makes contact with at least one first electrical trace finger of the plurality of first electrical trace fingers and at least one first electrical trace finger of the plurality of second electrical trace fingers may close the corresponding open circuit defined the open circuit pad 185. Each open circuit pad 185 may be aligned with one of the electrical shorting pads 172, such that the electrical shorting pad 172 makes contact with the open circuit pad 185 when a corresponding one of the buttons 112 is depressed. In this regard, each of the pair of electrical contacts may be configured to be electrically connected together in response to an actuation of a respective button 112. Each open circuit pad 185, when closed by a corresponding electrical shorting pad 172, may correspond to a command for execution by a load control device that is controlled by the keypad 100.

Each electrical shorting pad 172 may be dome shaped, and may define a diameter that is larger (e.g., slightly larger) than a corresponding open circuit pad 185. The electrical shorting pads 172 may be oriented such that a convex interior of each electrical shorting pad 172 faces rearward, toward the PCB 181. When a button 112 of the keypad 100 is depressed, the dome of a corresponding electrical shorting pad 172 may resiliently deflect, causing the electrical shorting pad 172 to make electrical contact with a corresponding open circuit pad 185 on the PCB 181. Each electrical shorting pad 172 may be configured to provide feedback indicative of operation of the corresponding button 112. For example, each electrical shorting pad 172 may produce an audible and/or tactile click when depressed, and/or when deflecting back to a relaxed state (e.g., after the button 112 is depressed and pressure is subsequently released from the button 112). The electrical shorting pads 172 may be made of any suitable material, such as metal.

Referring again to FIGS. 2A-2C, the control module 180 and the faceplate 102 may be configured such that the control module 180 may be attached to a back side of the faceplate 102. For example, as shown, the faceplate 102 may include one or more posts 106 that extend rearward from the rear surface 103 of the faceplate 102. Each post 106 may be flanked by a pair of walls 107. Each wall 107 may define an abutment surface 108 that is configured to abut the light guide assembly 150 when the control module 180 is attached to the faceplate 102. The abutment surfaces 108 may be spaced from the rear surface 103 of the faceplate 102 such that when the button assembly 110 is captured between the control module 180 and the faceplate 102, the button carrier 116 abuts the rear surface 103 of the faceplate 102 and may be constrained from moving along a direction that extends perpendicular to the front and rear surfaces 101, 103 of the faceplate 102. In this regard, when the button assembly 110 is captured between the control module 180 and the faceplate 102, the button carrier 116 may be prevented from moving inward relative to the control module 180.

The housing 186 may define openings 188 that extend therethrough (e.g., as shown in FIGS. 6A-6B). The housing 186 may be configured such that each opening 188 may align with a corresponding one of the posts 106 of the faceplate 102. As shown, the posts 106 may be cylindrical and hollow. The control module 180 may be attached to the faceplate 102, for example, using fasteners, such as screws 189 that are disposed into the openings 188 of the housing 186 and driven into place in the posts 106. In this regard, the housing 186 may be configured to capture the button assembly 110 between the housing 186 and the faceplate 102.

When the control module 180 is attached to the faceplate 102, the button assembly 110 may be captured between the control module 180 and the faceplate 102 such that the button carrier 116 is not constrained from moving in a plane that extends parallel to the front and rear surfaces 101, 103 of the faceplate 102. For example, when the control module 180 is attached to the faceplate 102 the button carrier 116, and thus the buttons 112, may move laterally (e.g., side to side) and/or longitudinally (e.g., up and down) within the opening 104 of the faceplate 102. Lateral and/or longitudinal movement of the buttons 112 within the opening 104, and thus of the button carrier 116, may be constrained by the inner surfaces 105 of the opening 104. In this regard, when the button assembly 110 is captured between the control module 180 and the faceplate 102, the buttons 112 may be moveable between opposed inner surfaces 105 of the opening 104 along a direction that extends parallel to the front and rear surfaces 101, 103 of the faceplate 102.

The adapter 190 may be configured to be attached to a structure, such as a structure within an interior wall of a building. As shown, the adapter 190 defines a pair of openings 192 that extend therethrough. The adapter 190 may be configured such that the openings 192 align with a structure to which the adapter 190 is to be attached.

The adapter 190 may also be configured to attach directly to an electrical wallbox. For example, as shown, the keypad 100 may include a pair of mounting tabs 195 that are removably attachable to the adapter 190. Each mounting tab 195 may define a pair of openings 196 that extend therethrough. The adapter 190 may define corresponding openings 193 that extend therethrough and that align with the openings 196 of the mounting tabs 195. The mounting tabs 195 may be attached to the adapter 190 using fasteners, such as screws 199 that are disposed into the openings 193 of the adapter 190 and driven into place in the openings 196 of the mounting tabs 195. Each mounting tab 195 may define an opening 197 that extends therethrough. Each mounting tab 195 may be configured such that, when the mounting tab 195 is attached to the adapter 190, the opening 197 aligns with a corresponding mounting hole in an electrical wallbox. As shown, one of the mounting tabs 195 may include a light guide 198 that is configured to guide ambient light (e.g., from a space in which the keypad 100 is installed) into an interior of the keypad and toward a light sensor (not shown) that is located inside the housing 186. As shown, the faceplate 102 may define a notch 191 that is configured to allow light to be collected by the light guide 198.

The adapter 190 and the faceplate 102 may be configured such that the faceplate 102 is removably attachable to the adapter 190. For example, as shown, the faceplate 102 may define one or more snap fit connectors 109 that are configured to engage with complementary features of the adapter 190. The illustrated adapter 190 defines an opening 194 that extends therethrough. In an example process of installing the keypad 100, the button assembly 110 may be disposed into the opening 104 of the faceplate 102 such that the buttons 112 are received in the opening 104 and the button carrier 116 abuts the rear surface 103 of the faceplate 102. The control module 180 may then be attached to the rear side of the faceplate 102 using the screws 189. Electrical wiring may be passed through the opening 194 in the adapter 190 and into the housing 186, for instance to place the keypad 100 in electrical communication with one or more external load control devices. The adapter 190 may be attached to a structure. The faceplate 102 may then be attached (e.g., snapped into place) on the adapter 190.

In an example of operation of the keypad 100, when a particular one of the buttons 112 is depressed (e.g., under a force applied to the button 112 by a user of the keypad 100), the actuator 144 of a corresponding return member 140 is biased inward, causing the contact dome 142 of the return member 140 to collapse toward the light guide assembly 150. The post 146 of the return member 140 may abut a corresponding force concentrator 170 enclosed within the light guide assembly 150, and may transfer the applied force to the force concentrator 170. The force transferred to the force concentrator 170 may cause a corresponding one of the electrical shorting pads 172 to make contact with a corresponding one of the open circuit pads 185 on the PCB 181, which may close a circuit associated with the open circuit pad 185. The keypad 100 may, in response to the circuit associated with the open circuit pad 185 being closed, transmit a command to a load control device, for example via the communication link. When the force applied to the button 112 is removed (e.g., at the completion of depression of the button 112), the contact dome 142 may resiliently return to a non-collapsed (e.g., relaxed) state, and may bias the corresponding button 112 outward to a respective rest position.

Figure 8:
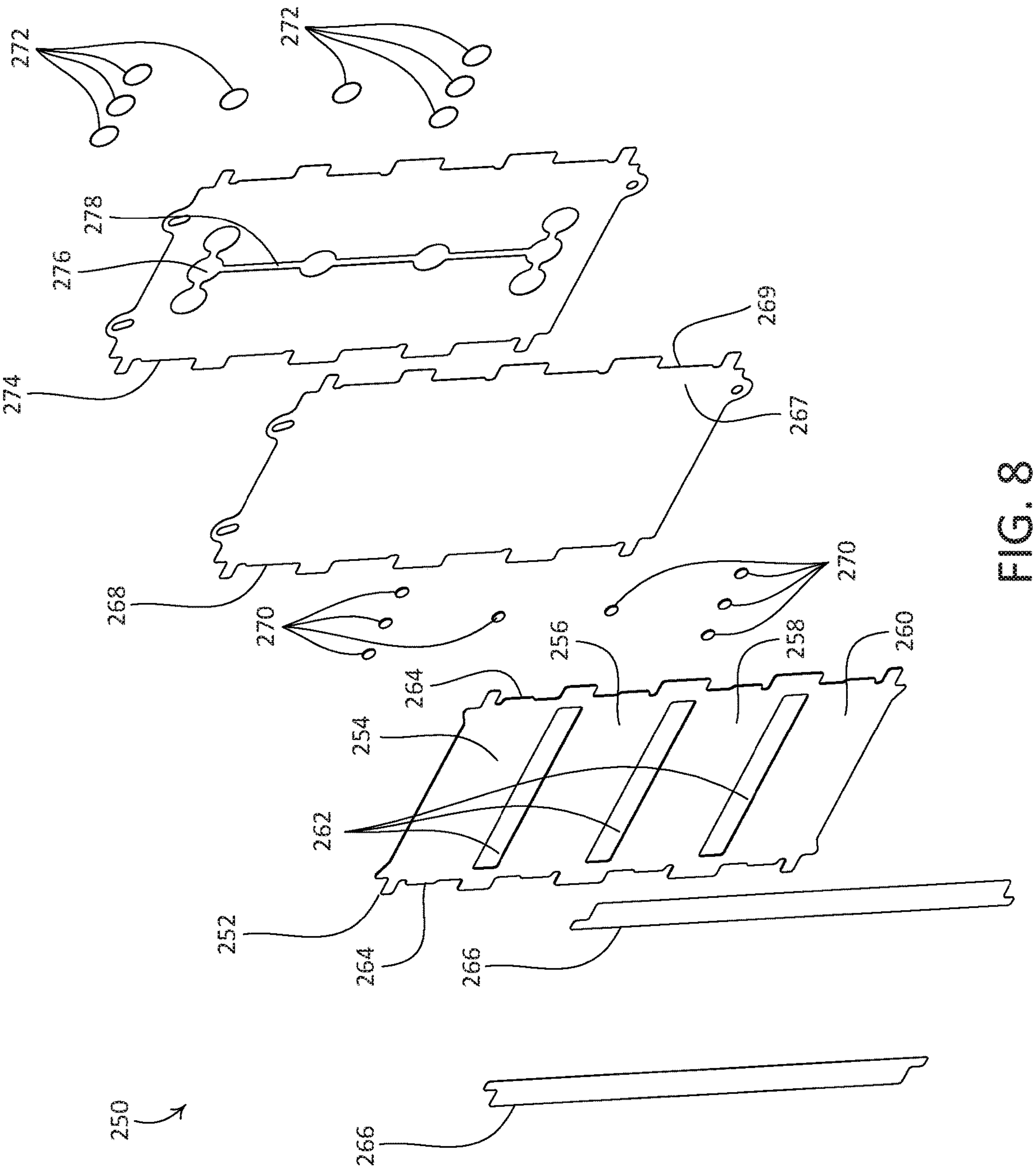
FIG. 8 is an exploded view of another example light guide assembly that may be used with the control module of the example control device illustrated in FIG. 1A.

FIG. 8 depicts another example light guide assembly 250 that may be implemented in the keypad 100. The light guide assembly 250 may be configured to disperse light emitted by the plurality of LEDs 184. As shown, the light guide assembly 250 includes a light guide film layer 252. The light guide film layer 252 may define one or more regions that are configured to disperse light from corresponding ones of the plurality of LEDs 184. As shown, the light guide film layer 252 defines a first dispersion region 254 that is configured to disperse light emitted by a first opposed pair of LEDs 184 behind a first one of the buttons 112 (e.g., the uppermost button 112), a second dispersion region 256 that is configured to disperse light emitted by a second opposed pair of LEDs 184 behind a second one of the buttons 112 (e.g., the second to uppermost button 112), a third dispersion region 258 that is configured to disperse light emitted by a third opposed pair of LEDs 184 behind a third one of the buttons 112 (e.g., the second to lowermost button 112), and a fourth dispersion region 260 that is configured to disperse light emitted by a fourth opposed pair of LEDs 184 behind a fourth one of the buttons 112 (e.g., the lowermost button 112). As shown, the light guide film layer 252 defines a plurality of openings 262 that separate and partially define the first, second, third, and fourth dispersion regions 254, 256, 258, 260. For each of the first, second, third, and fourth dispersion regions 254, 256, 258, 260, the light guide film layer 252 defines an opposed pair of tabs 264 that are configured to receive light emitted from a corresponding pair of LEDs 184.

The light guide assembly 250 may further include one or more reflector strips 266 that are configured to reflect light emitted from the LEDs 184 back into the light guide film layer 252. As shown, the light guide assembly 250 includes a first reflector strip 266 that is disposed along a first side of the light guide film layer 252, and a second reflector strip 266 that is disposed along an opposed second side of the light guide film layer 252.

The light guide assembly 250 may further include a carrier layer 268 that is disposed adjacent to the light guide film layer 252 and that may be attached to the light guide film layer 252. The carrier layer 268 may define a front surface 267 and an opposed rear surface 269. The light guide assembly 250 may further include one or more force concentrators 270 that are disposed between the carrier layer 268 and the light guide film layer 252. The force concentrators 270 may be attached to the front surface 267 of the carrier layer 268. Each force concentrator 270 may be aligned with a corresponding one of the buttons 112. The light guide assembly 250 may further include one or more electrical shorting pads 272 that may be attached to the rear surface 269 of the carrier layer 268, such that each electrical shorting pad 272 is aligned with a corresponding one of the force concentrators 270, and such that the electrical shorting pads 272 are aligned with corresponding ones of the buttons 112. As shown, in contrast with the light guide assembly 150, the light guide assembly 250 includes three force concentrators 270 and three electrical shorting pads 272 that correspond to the uppermost button 112, and three force concentrators 270 and three electrical shorting pads 272 that correspond to the lowermost button 112. This may enable three separate commands to be associated with the uppermost button 112 and the lowermost button 112 (e.g., by pressing one of the uppermost or lowermost buttons near the left side of the button 112, near the middle of the button 112, or near the right side of the button 112).

The light guide assembly 250 may further include a spacer layer 274 that may be attached to the rear surface 269 of the carrier layer 268. The spacer layer 274 may define one or more openings that are aligned with the electrical shorting pads 272. As shown, the spacer layer 274 defines a plurality of openings 276 that extend therethrough and that define respective diameters that are greater than that of corresponding ones of the electrical shorting pads 272. The openings 276 may be interconnected by respective slots 278 that extend through the spacer layer 274. The spacer layer 274 may operate to prevent the contact domes 142 of the return members 140 from remaining in partially collapsed positions after respective ones of the buttons 112 are depressed.

Figure 9:
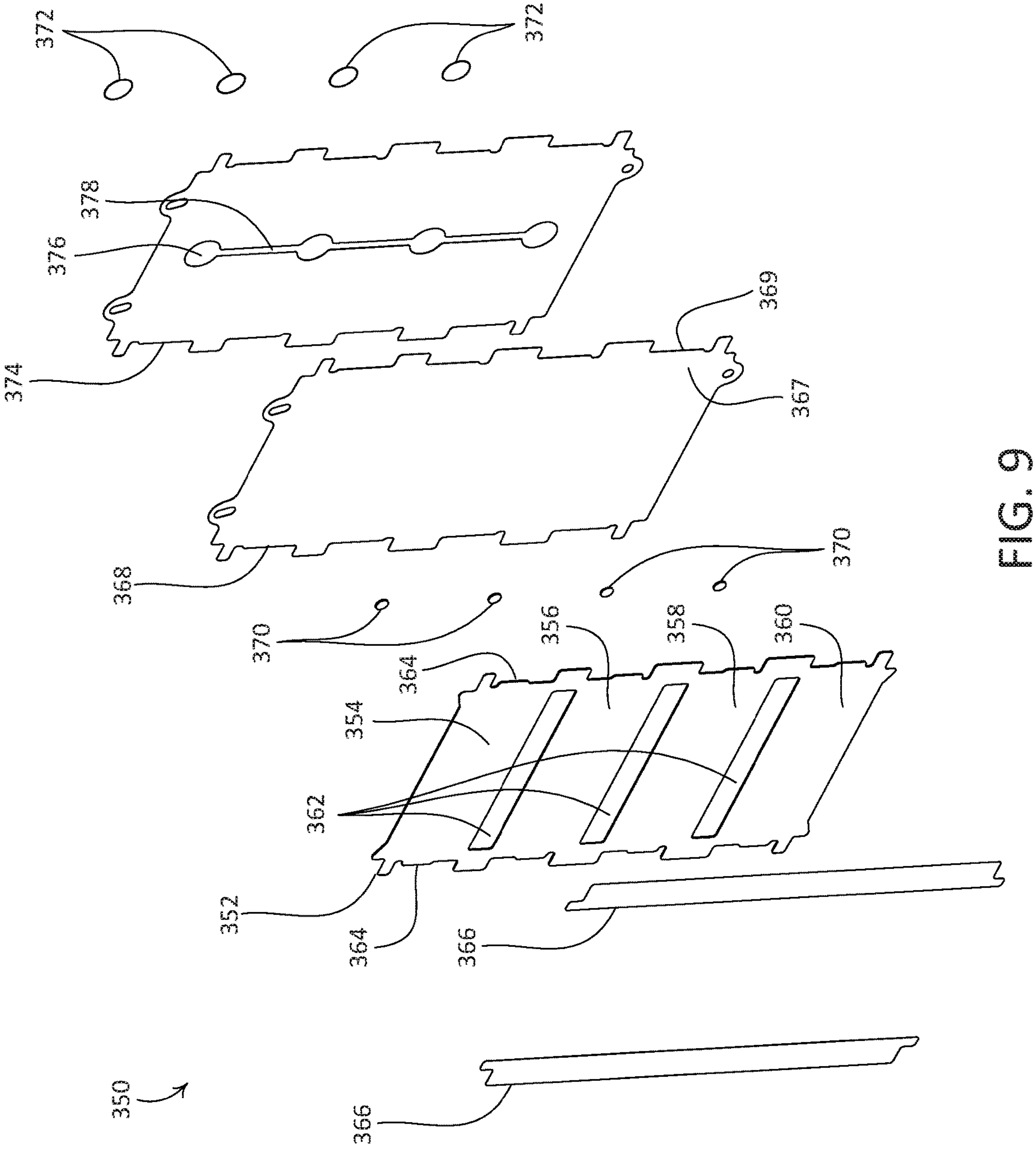
FIG. 9 is an exploded view of still another example light guide assembly that may be used with the control module of the example control device illustrated in FIG. 1A.
Figure 10:
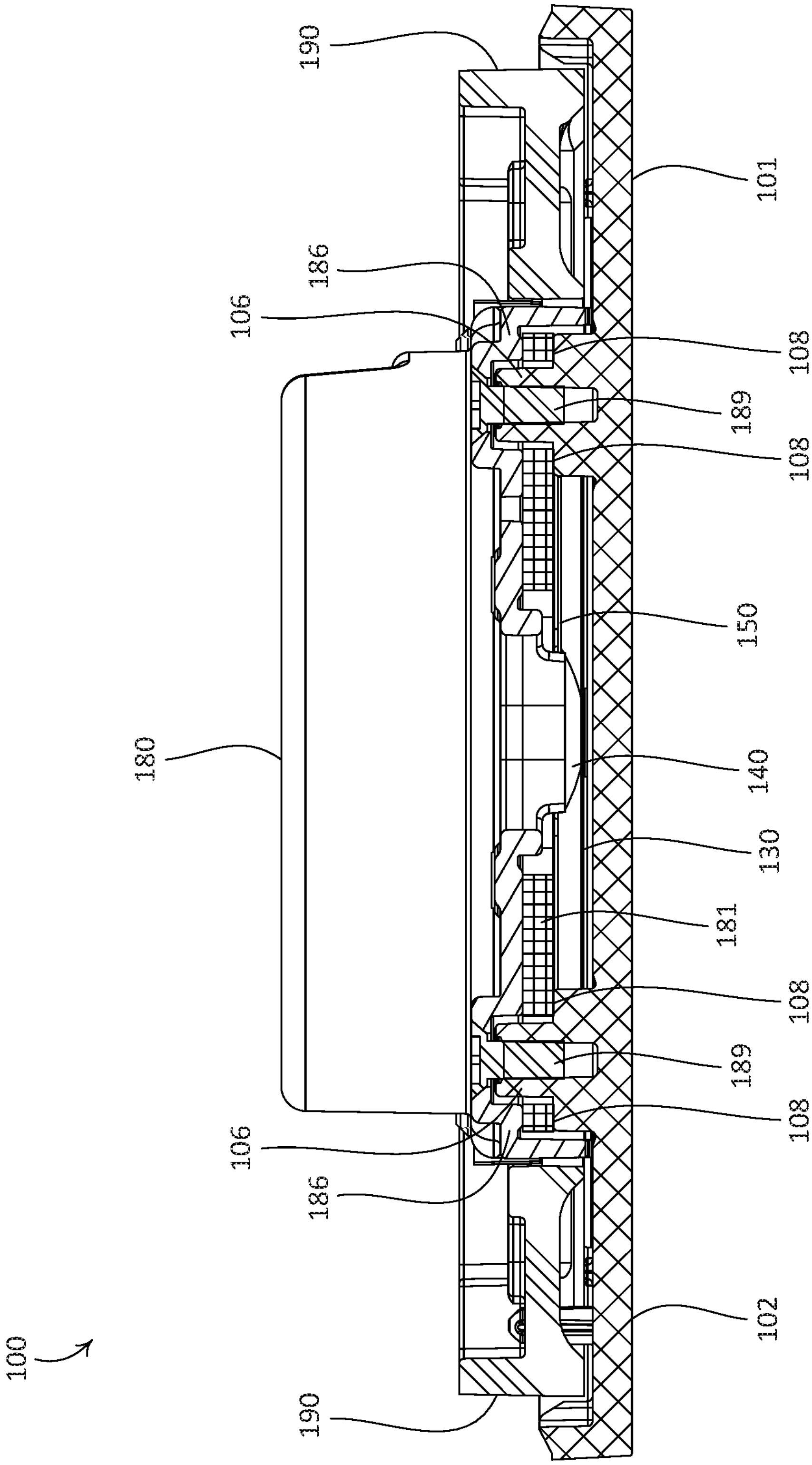
FIG. 10 is top section view of the example control device illustrated in FIG. 1A.

FIG. 9 depicts another example light guide assembly 350 that may be implemented in the keypad 100. The light guide assembly 350 may be configured to disperse light emitted by the plurality of LEDs 184. As shown, the light guide assembly 350 includes a light guide film layer 352. The light guide film layer 352 may define one or more regions that are configured to disperse light from corresponding ones of the plurality of LEDs 184. As shown, the light guide film layer 352 defines a first dispersion region 354 that is configured to disperse light emitted by a first opposed pair of LEDs 184 behind a first one of the buttons 112 (e.g., the uppermost button 112), a second dispersion region 356 that is configured to disperse light emitted by a second opposed pair of LEDs 184 behind a second one of the buttons 112 (e.g., the second to uppermost button 112), a third dispersion region 358 that is configured to disperse light emitted by a third opposed pair of LEDs 184 behind a third one of the buttons 112 (e.g., the second to lowermost button 112), and a fourth dispersion region 360 that is configured to disperse light emitted by a fourth opposed pair of LEDs 184 behind a fourth one of the buttons 112 (e.g., the lowermost button 112). As shown, the light guide film layer 352 defines a plurality of openings 362 that separate and partially define the first, second, third, and fourth dispersion regions 354, 356, 358, 360. For each of the first, second, third, and fourth dispersion regions 354, 356, 358, 360, the light guide film layer 352 defines an opposed pair of tabs 364 that are configured to receive light emitted from a corresponding pair of LEDs 184. When the keypad 100 is in an assembled configuration, the contact domes 142 of the return members 140 may abut the light guide film layer 352.

The light guide assembly 350 may further include one or more reflector strips 366 that are configured to reflect light emitted from the LEDs 184 back into the light guide film layer 352. As shown, the light guide assembly 350 includes a first reflector strip 366 that is disposed along a first side of the light guide film layer 352, and a second reflector strip 366 that is disposed along an opposed second side of the light guide film layer 352.

The light guide assembly 350 may further include a carrier layer 368 that is disposed adjacent to the light guide film layer 352 and that may be attached to the light guide film layer 352. The carrier layer 368 may define a front surface 367 and an opposed rear surface 369. The light guide assembly 350 may further include one or more force concentrators 370 that are disposed between the carrier layer 368 and the light guide film layer 352. The force concentrators 370 may be attached to the front surface 367 of the carrier layer 368. Each force concentrator 370 may be aligned with a corresponding one of the buttons 112. The light guide assembly 350 may further include one or more electrical shorting pads 372 that may be attached to the rear surface 369 of the carrier layer 368, such that each electrical shorting pad 372 is aligned with a corresponding one of the force concentrators 370, and such that the electrical shorting pads 372 are aligned with corresponding ones of the buttons 112. As shown, in contrast with the light guide assemblies 150 and 205, the light guide assembly 350 includes a single force concentrator 370 and a single electrical shorting pad 372 for each button 112.

The light guide assembly 350 may further include a spacer layer 374 that may be attached to the rear surface 369 of the carrier layer 368. The spacer layer 374 may define one or more openings that are aligned with the electrical shorting pads 372. As shown, the spacer layer 374 defines a plurality of openings 376 that extend therethrough and that define respective diameters that are greater than that of corresponding ones of the electrical shorting pads 372. The openings 376 may be interconnected by respective slots 378 that extend through the spacer layer 374. The spacer layer 374 may operate to prevent the contact domes 142 of the return members 140 from remaining in partially collapsed positions after respective ones of the buttons 112 are depressed.

Figure 11A:
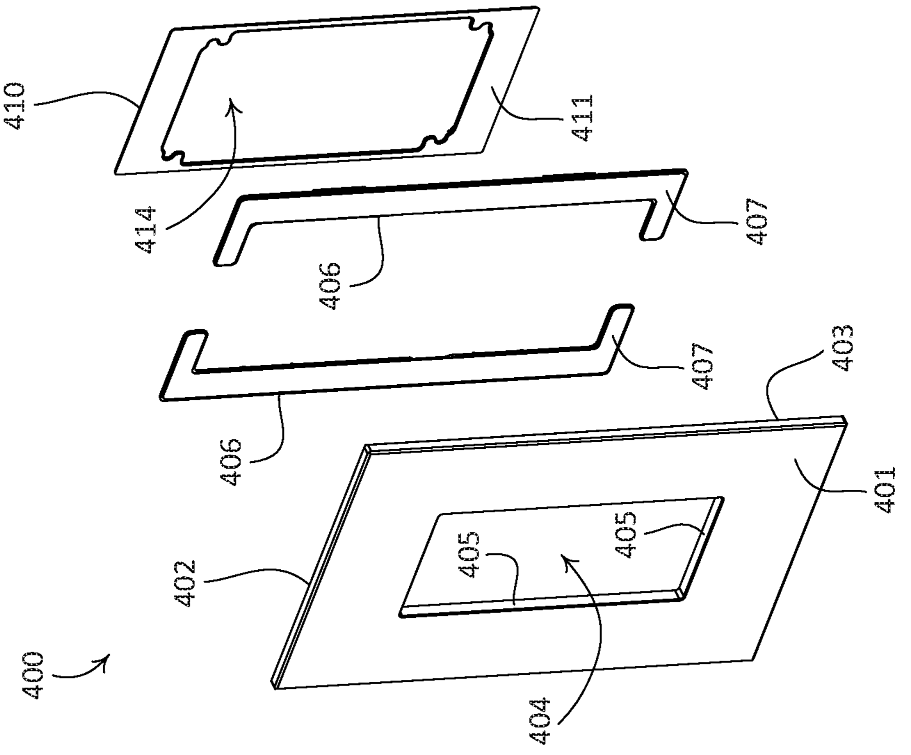
FIG. 11A is a front-facing exploded view of an example alternative faceplate assembly that may be used with the example control device illustrated in FIG. 1A.
Figure 11B:
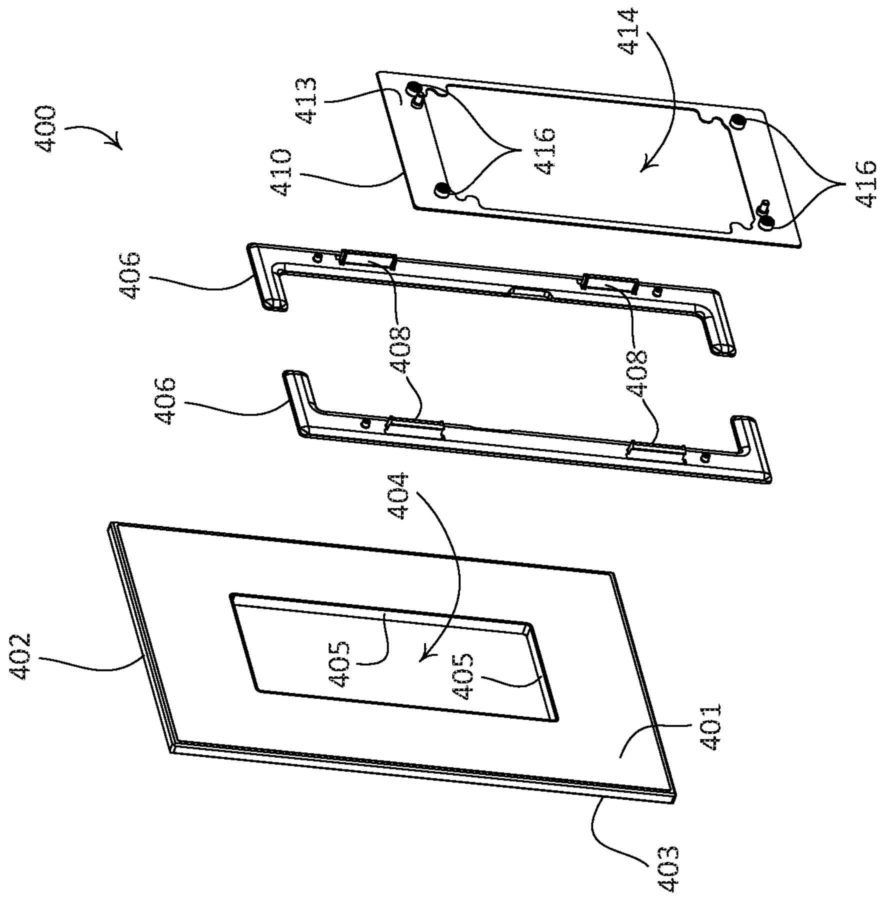
FIG. 11B is a rear-facing exploded view of the faceplate assembly illustrated in FIG. 11A.

FIGS. 11A-11B depict an example faceplate assembly 400 that may be implemented in the keypad 100. As shown, the faceplate assembly 400 includes a plate 402, a pair of adapter attachment plates 406, and a control module mounting plate 410. The plate 402 may define a front surface 401 that faces outward relative to a structure to which the keypad 100 is installed and an opposed rear surface 403 that faces inward relative to the structure. The front surface 401 may be referred to as an outer surface of the faceplate assembly 400 and the rear surface 403 may be referred to as an inner surface of the faceplate assembly 400. The plate 402 may define an opening 404 that extends therethrough and that is configured to at least partially receive the buttons 112 therein. For example, the opening 404 may be sized to receive the buttons 112 such that the gap G1 is defined between inner surfaces 405 of the opening 404 and corresponding outer peripheral surfaces 112*c* of the buttons 112. The plate 402 may be made of any suitable material, such as glass.

The adapter attachment plates 406 may be configured to be attached to the plate 402. For example, as shown, the adapter attachment plates 406 may define smooth rear surfaces 407 that are configured to be adhered to the rear surface 403 of the plate 402. Each adapter attachment plate 406 may define one or more snap fit connectors 408 that are configured to engage with complementary features of the adapter 190, such that the faceplate assembly 400 may be removably attached to the adapter 190. The adapter attachment plates 406 may be made of any suitable material, such as plastic.

The control module mounting plate 410 may be configured to be attached to the plate 402. For example, as shown the control module mounting plate 410 define a smooth rear surface 411 that is configured to be adhered to the rear surface 403 of the plate 402. The control module mounting plate 410 may be configured to fit within an area of the rear surface 403 of the plate 402 that is enclosed by the adapter attachment plates 406. The control module mounting plate 410 may define an opening 414 that extends therethrough and that is configured to at least partially receive the buttons 112 therein. The control module mounting plate 410 may be made of any suitable material, such as metal.

Figure 12:
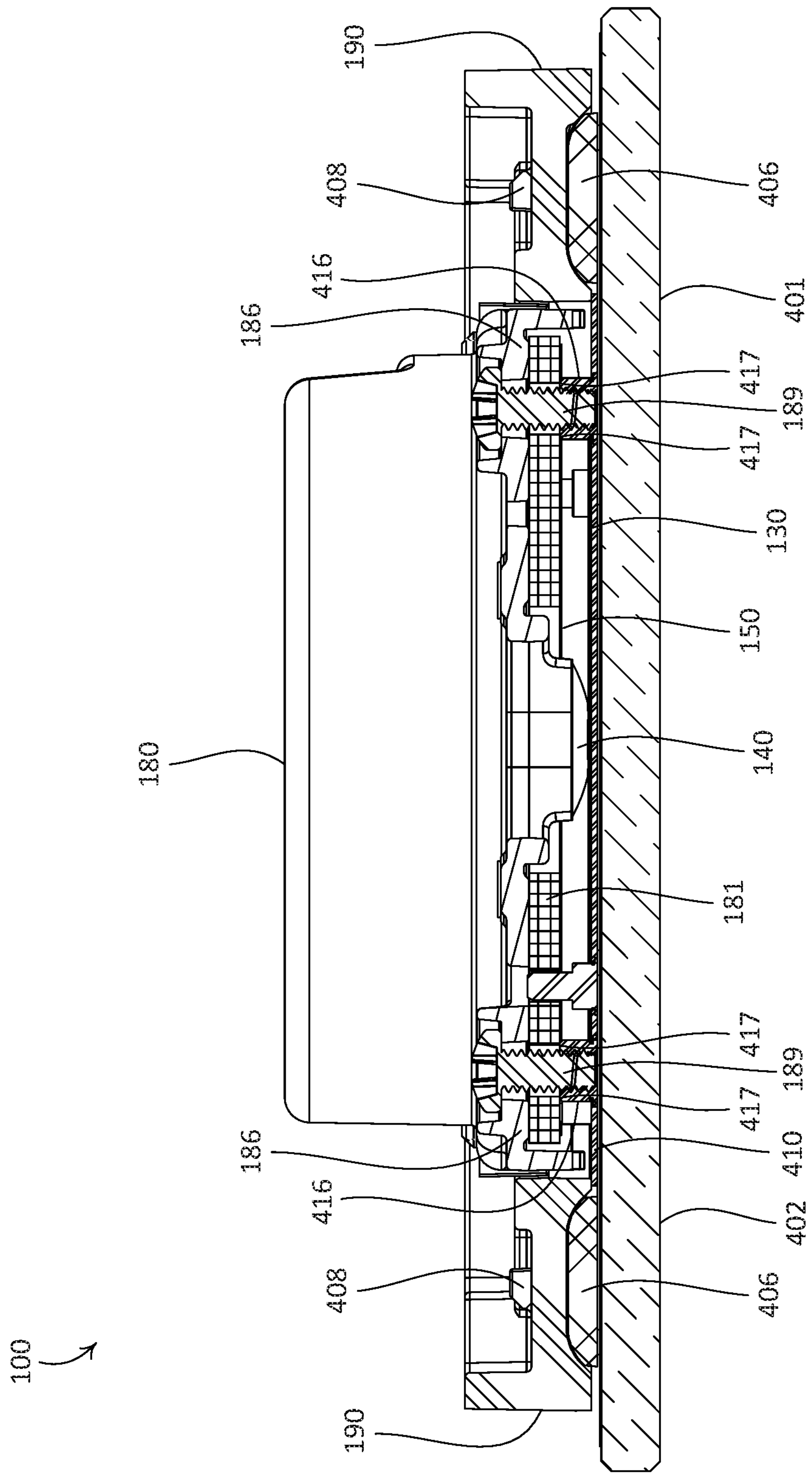
FIG. 12 is top section view of the example control device illustrated in FIG. 1A, with the faceplate component replaced with the example alternative faceplate assembly illustrated in FIGS. 11A-11B.

The control module mounting plate 410 may be configured such that the control module 180 may be attached to the faceplate assembly 400. For example, as shown, the control module mounting plate 410 may include one or more posts 416 that extend rearward from a rear surface 413 of the control module mounting plate 410. The posts 416 may be cylindrical and hollow, and may define threaded inner surfaces that are configured to receive the screws 189. Each post may define an abutment surface 417 (e.g., as shown in FIG. 12) that is configured to abut the light guide assembly 150 when the control module 180 is attached to the control module mounting plate 410. The abutment surfaces 417 may be spaced from the rear surface 403 of the plate 402 such that when the button assembly 110 is captured between the control module 180 and the faceplate assembly 400, the button carrier 116 abuts the rear surface 403 of the plate 402 and may be constrained from moving along a direction that extends perpendicular to the front and rear surfaces 401, 403 of the faceplate 402. In this regard, when the button assembly 110 is captured between the control module 180 and the faceplate assembly 400, the button carrier 116 may be prevented from moving inward relative to the control module 180.

The control module 180 may be attached to the faceplate assembly 400 by disposing the screws 189 into the openings 188 of the housing 186 and driving the screws 189 into place in the posts 416. In this regard, the housing 186, and thus the control module 180, may capture the button assembly 110 between the housing 186 and the faceplate assembly 400. As shown, the opening 414 of the control module mounting plate 410 may be configured such that the button carrier 116 of the button assembly 110 may abut the rear surface 403 of the plate 402 when the control module 180 is attached to the faceplate assembly 400.

Figure 13:
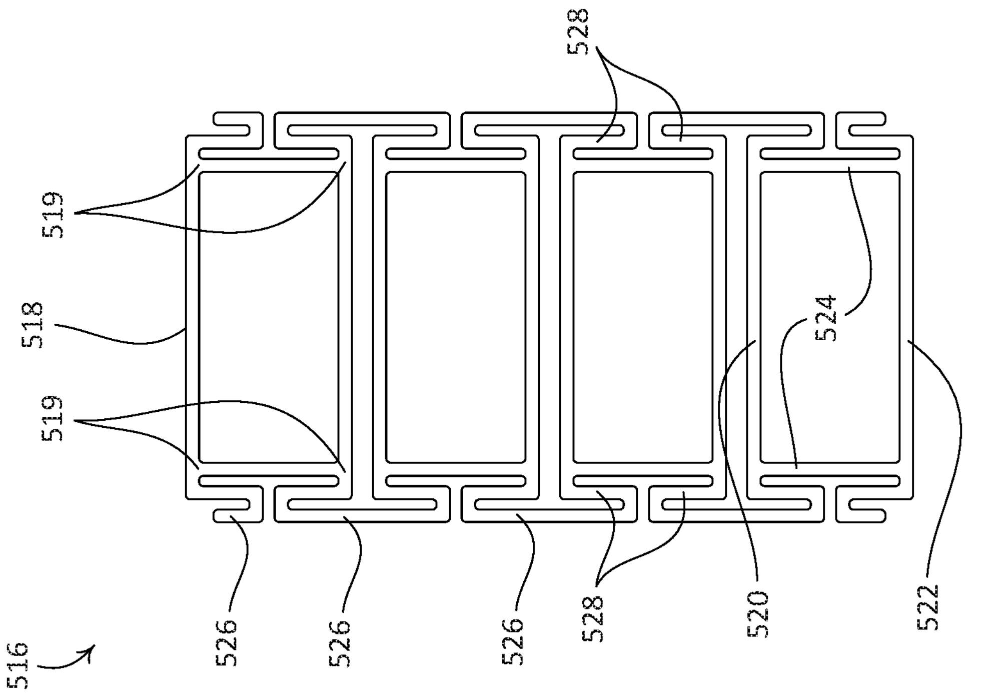
FIG. 13 is a front view of another button carrier component that may be used with the button assembly illustrated in FIGS. 3A-3B.

FIG. 13 depicts another example button carrier 516 that may be used with the button assembly illustrated in FIGS. 3A-3B, for example instead of the button carrier 116. As shown, the button carrier 516 may define one or more button frames 518. Each button frame 518 may be configured to support a respective one of the buttons 112. As shown, each button frame 518 may be defined by an upper frame member 520, a lower frame member 522, and opposed side frame members 524 that extend between the upper and lower frame members 520, 522. Each button frame 518 may be configured such that a corresponding button 112 may be attached to the button frame 518. For example, as shown, the upper and lower frame members 520, 522 are spaced apart such that the when a button 112 is attached to the button frame 518, the upper frame member 520 is received in the notches 114 at the upper end of the button 512, and the lower frame member 522 is received in the notches 114 at the lower end of the button 112. The buttons 112 may be attached to respective ones of the button frames 518, for example by gluing the buttons 112 to the button frames 518. The upper and lower frame members 520, 522 of adjacent button frames 518 may be spaced apart from each other such that, when respective buttons 112 are attached to the adjacent button frames 518, the facing outer peripheral surfaces 112*c* of adjacent buttons 112 are spaced apart from each other by the gap G2. As shown, the button carrier 516 is configured to support four buttons 112 in a linear array that extends vertically.

The button carrier 516 may further define one or more support sections 526 that are configured to abut the rear surface 103 of the faceplate 102 when the keypad 100 is in an assembled configuration (e.g., with the control module 180 attached to the faceplate 102). In accordance with the illustrated button carrier 516, a first plurality of support sections 526 may extend along a first side of the button carrier 516, and a second plurality of support sections 526 may extend along an opposed second side of the button carrier 516. The button carrier 516 may be floatingly captured between the faceplate 102 and the control module 180, for example such that the button assembly 110 is supported by, but is not physically attached to, the faceplate 102 and the control module 180. This may allow a first button assembly of the keypad 100 to be swapped out for another button assembly that may have a different button configuration.

The button carrier 516 may further include a plurality of resilient, independently deflectable spring arms 528 that connect the button frames 518 to the support sections 526. As shown, each button frame 518 may be supported by four spring arms 528 at respective corners 519 of the button frame 518, such that the corners 113 of each button 112 are suspended by a corresponding spring arm 528. The spring arms 528 may be configured to allow the button frames 518 to deflect relative to the support sections 526, and to allow the button frames 518 to deflect independently relative to each other. Additionally, the spring arms 528 may enable the entirety of a button 112 to move inward as the button 112 is depressed, which may provide a more satisfying tactile feel to operation of the buttons 112 by a user of the keypad 100, for example, in comparison to known keypads having buttons that are pivotally supported (e.g., along respective edges of the buttons).

The button carrier 516 may operate to maintain the spacing of the buttons 112 relative to each other, and may operate to maintain the spacing of the buttons 112 relative to the opening 104 of the faceplate 102. This may provide uniform, controlled deflection of each button 112, for example as the buttons 112 are operated from rest positions to depressed positions. The button carrier 516 may constrain the buttons 112 during operation, such that the buttons 112 do not interfere with each other, for instance by making contact with one another. For example, when a single button 112 is depressed corresponding spring arms 528 supporting the button 112 may deflect, and may operate to maintain the spacing between the depressed button 112 and one or more adjacent buttons 112 and/or the inner surfaces 105 of the opening 104 of the faceplate 102. In another example, when multiple buttons 112 are depressed simultaneously respective spring arms 128 supporting the buttons 112 may deflect, and may operate to maintain the spacing between the buttons 112 and and/or the inner surfaces 105 of the opening 104 of the faceplate 102.

Additionally, the button carrier 516 may operate to align respective outer surfaces 112*a* of the buttons 112 relative one another and relative to the front surface 101 of the faceplate 102, for example such that the outer surfaces 112*a* of the buttons 112 are substantially coplanar with the front surface 101 of the faceplate 102 when the support sections 526 of the button carrier 516 abut the rear surface 103 of the faceplate 102 and the buttons 112 are in respective rest positions.

FIGS. 14A-14B, 15, and 16 depict an example control device that is configured for use in controlling one or more temperature regulation appliances, such as a furnace, a heat pump, an air conditioning unit, a heating, ventilation, and air-conditioning (HVAC) system, or the like. As shown, the example control device is configured as a wall-mounted thermostat 600. The thermostat 600 may include a faceplate 602, a button assembly 610, a display screen 630, one or more return members 640, a light guide assembly 650, a first PCB 680, a second PCB 681, and a housing 690 that is configured to be mounted to a structure.

The button assembly 610 may include one or more buttons 612 and a button carrier 616 that is configured to support (e.g., carry) the one or more buttons 612. The illustrated thermostat 600 includes five buttons 612 that are rectangular in shape and are of the same size. As shown, each button 612 defines four corners 613 along an outer perimeter of the button 612, an outward-facing outer surface 612*a*, an opposed, inward-facing inner surface 612*b*, and respective outer peripheral surfaces 612*c*. However, it should be appreciated that the thermostat 600 is not limited to buttons having the illustrated button geometries. For example, the thermostat 600 may alternatively include more or fewer buttons having the same or different geometries and/or sizes. The buttons 612 may be made of any suitable material, for example plastic, glass, metal, or the like. Alternatively, the buttons 612 may be made of a mix of materials. For example, each button 612 may include a body that is made of a first material (e.g., plastic), and may include a veneer that is made of a different material (e.g., metal) and that is attached to the body of the button 612. The buttons 212 may be attached (e.g., glued) to the button carrier 616.

As shown, the faceplate defines a front surface 601 that faces outward relative to a structure to which the thermostat 600 is installed and an opposed rear surface 603 that faces inward relative to the structure. The front surface 601 may be referred to as an outer surface of the faceplate 602 and the rear surface 603 may be referred to as an inner surface of the faceplate 602. The faceplate 602 may define an opening 604 that extends therethrough and that is configured to at least partially receive the buttons 612. For example, in accordance with the illustrated thermostat 600, the opening 604 may be sized to receive the buttons 612 such that a gap G3 is defined between inner surfaces 605 of the opening 604 and corresponding outer peripheral surfaces 612*c* of the buttons 612. The faceplate 602 may be made of the same material, or using the same mix of materials, as the buttons 612. Alternatively, the faceplate 602 and the buttons 612 may be made of different materials. The faceplate 602 may include a window 607 that is configured to protect the display screen 630. The window 607 may be made of a clear material, such as clear plastic.

The button carrier 616 may define one or more button frames 618. Each button frame 618 may be configured to support a respective one of the buttons 612. As shown, each button frame 618 may be defined by an upper frame member 620, a lower frame member 622, and opposed side frame members 624 that extend between the upper and lower frame members 620, 622. The button frames 618 may be configured such that a corresponding button 612 may be attached to each button frame 618. For example, the button frames 618 may define respective outer perimeters that are shorter than outer perimeters of the buttons 612, such that the each button frame 618 may be attached to the inner surface 612*b* of a corresponding button 612.

The buttons 612 may be attached to corresponding ones of the button frames 618, for example by gluing the buttons 612 to the button frames 618. The upper, lower, and/or side frame members 620, 622, 624 of adjacent button frames 618 may be spaced apart from each other such that, when respective buttons 612 are attached to adjacent button frames 618, the facing outer peripheral surfaces 612*c* of adjacent buttons 612 are spaced apart from each other by a gap G4 that is substantially the same as (e.g., equal to) the gap G3 between the buttons 612 and the opening 604 of the faceplate 602. As shown, the button carrier 616 is configured to support five buttons 612 in an inverted U-shaped array. The button carrier 616 may be floatingly supported by the housing 690, for example such that the button assembly 610 is supported by the housing 690 without being physically attached to the housing 690. This may allow a first button assembly of the thermostat 600 to be swapped out for another button assembly that may have a different button configuration.

The button carrier 616 may further include a plurality of resilient, independently deflectable spring arms 626 that connect the button frames 618 to each other. As shown, each button frame 618 may be supported by two spring arms 626 that are attached to the button frame 618 (e.g., at a corner of the button frame 618). The spring arms 626 may be configured to allow the button frames 618 to deflect independently relative to each other. Additionally, the spring arms 626 may enable the entirety of a button 612 to move inward as the button 612 is depressed, which may provide a more satisfying tactile feel to operation of the buttons 212 by a user of the thermostat 600, for example, in comparison to known thermostats having buttons that are pivotally supported (e.g., along respective edges of the buttons).

The button carrier 616 may operate to maintain the spacing of the buttons 612 relative to each other, and may operate to maintain the spacing of the buttons 612 relative to the opening 604 of the faceplate 602. This may provide uniform, controlled deflection of each button 612, for example as the buttons 612 are operated from rest positions to depressed positions. The button carrier 616 may constrain the buttons 612 during operation, such that the buttons 612 do not interfere with each other, for instance by making contact with one another. For example, when a single button 612 is depressed corresponding spring arms 626 supporting the button 612 may deflect, and may operate to maintain the spacing between the depressed button 612 and one or more adjacent buttons 612 and/or the inner surfaces 605 of the opening 604 of the faceplate 602. In another example, when multiple buttons 612 are depressed simultaneously respective spring arms 626 supporting the buttons 612 may deflect and may operate to maintain the spacing between the buttons 612 and/or the inner surfaces 605 of the opening 604 of the faceplate 602.

Figure 14B:
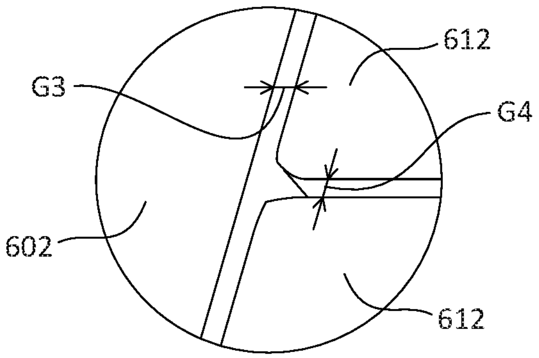
FIG. 14B is a zoomed in view of a portion of the example control device illustrated in FIG. 14A.
Figure 14A:
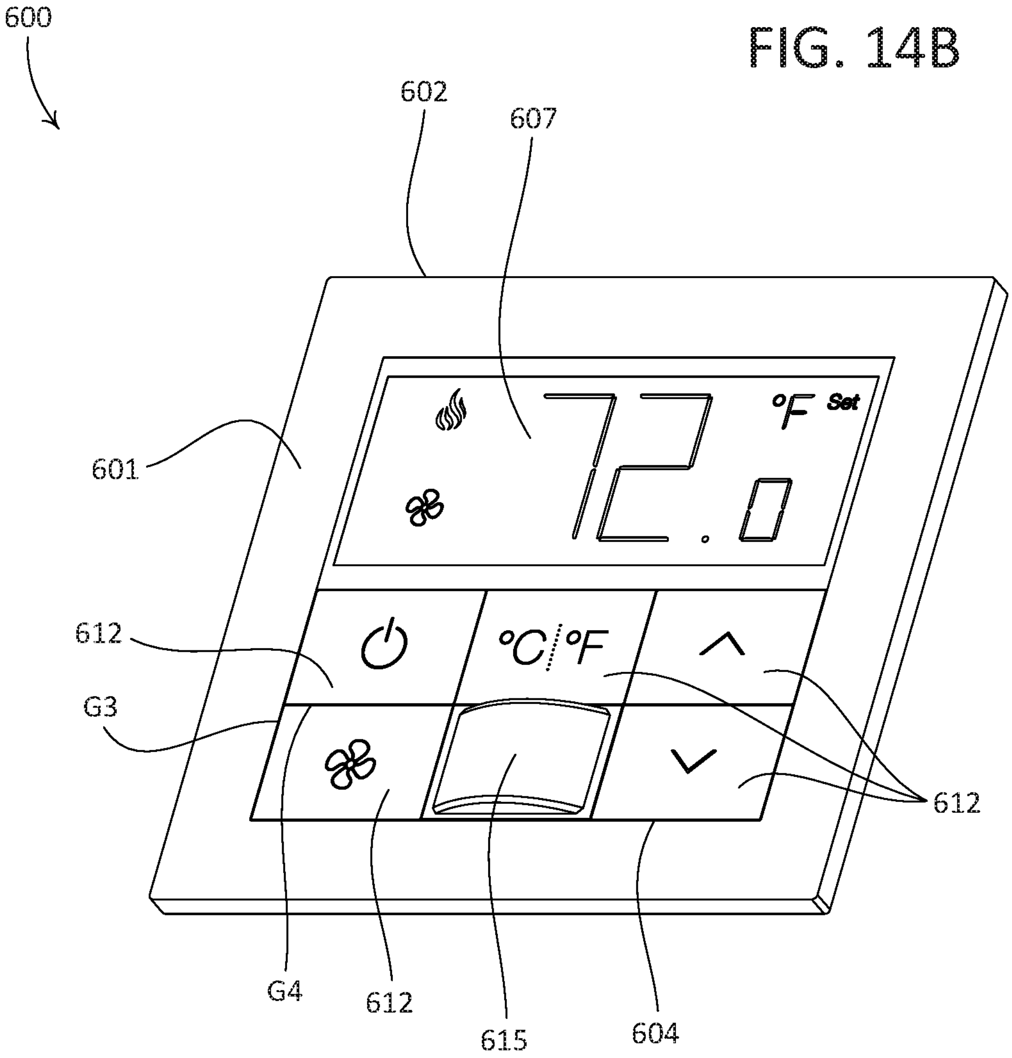
FIG. 14A is a perspective view of an example control device, configured as a thermostat, for use in controlling one or more temperature regulation appliances.

The buttons 612 may include indicia, such as text, icons, or the like (e.g., as shown in FIG. 14A). As shown, the indicia may be cut through the buttons 112. The indicia may be filled, for instance with a translucent or clear material. Alternatively, the indicia may be etched into surfaces (e.g., the outer surfaces 612*a* and/or the inner surfaces 612*b*) of the respective buttons 612, may be printed on the outer surfaces 612*a* of the buttons 612, or may be otherwise formed or displayed on the buttons 612. The indicia may be indicative of respective functions that are invoked by depressing the buttons 612 of the thermostat 600.

The thermostat 600 may include one or more lighting elements (e.g., light sources) that are configured to illuminate respective interiors (e.g., inner surfaces 612*b*) of the buttons 612, such that the indicia of the buttons 612 are backlit from within an interior of the thermostat 600. For example, the thermostat 600 may a plurality of lighting elements, such as LEDs, that are disposed within the housing 690 of the thermostat 600, for instance behind the buttons 612, and that are configured to backlight the buttons 612. As shown, the thermostat 600 includes five LEDs 684 (only four are shown) that are mounted to a front surface 682 of the first PCB 680. The LEDs 684 may be configured to emit light into the light guide assembly 650, for example to backlight the buttons 612. As shown, a single LED 684 may be disposed near a respective side of each of the buttons 612.

It should be appreciated that the thermostat 600 is not limited to the illustrated configuration of LEDs 684, which may be referred to as a backlighting configuration of the thermostat 600. For example, in alternative backlighting configurations, the thermostat 600 may include more or fewer LEDs, which may be positioned in one or more of the same or different positions relative to the light guide assembly 650. It should further be appreciated that thermostat 600 is not limited to LEDs 684 that are mounted to the front surface 682 of the first PCB 680, and that one or more of the LEDs 684 may be otherwise mounted so as to backlight one or more of the buttons 612.

The thermostat 600 may be configured to, responsive to one or more buttons 612 being depressed, transmit one or more digital messages via a communication link to one or more temperature regulation appliances. The one or more digital messages may include, for example, one or more commands for execution by the one or more temperature regulation appliances. The communication link may comprise a wired communication link or a wireless communication link, such as a radio-frequency (RF) communication link. The thermostat 600 may further include a control circuit (e.g., residing on the first PCB 680) and a temperature sensor (not shown) that is in electrical communication with the control circuit. The thermostat 600 may further include an occupancy sensing circuit (not shown) that is in electrical communication with the control circuit. The second PCB 281 may be in electrical communication with the occupancy sensing circuit. The display screen 630 may be in electrical communication with the control circuit, and may be configured to display information related to operation of the thermostat 600. The thermostat 600 may further include a bracket 632 that is configured to attach the display screen 630 to the housing 690.

As shown, the button assembly 610 may further include a lens assembly that is supported by the button carrier 616. The lens assembly may include a lens frame 614 that defines an outer perimeter of substantially the same length as that of the buttons 612, a lens 615 that is configured to attach to the lens frame 614, and a support 617 that is configured to prevent unintended deflection of the lens 615. As shown, the button carrier may define a button frame 619 to which the lens frame 614 may be attached. The lens assembly may be aligned with a sensor element, such as a pyroelectric infrared (PIR) detector, of the occupancy sensing circuit. The lens assembly may be configured to operate as a button of the thermostat 600. Alternatively, in accordance with an alternative configuration of the thermostat 600, the lens frame 614 may be replaced with another button 612.

The thermostat 600 may include a plurality of return members 640 that are configured to bias the buttons 612 from depressed positions to rest positions, for example after the buttons 612 are depressed and pressure is subsequently released from the buttons 612. As shown, each return member 640 includes a base 642 and a plurality of deflectable, resilient fingers 644 that extend outward from the base 642. The fingers 644 of each return member 640 are configured to abut the inner surface 612*b* of a corresponding one of the buttons 612 when the corresponding button 612 is in the rest position. The fingers 644 of each return member 640 are configured to deflect when a corresponding one of the buttons 612 is operated to the depressed position, and to bias the button 612 from the depressed position to the rest position when operation of the button 612 ceases, for example after the button 612 is depressed and pressure is subsequently released from the button 612. As shown, the return members 640 may be attached to the light guide assembly 650, such that the return members 640 are aligned with corresponding ones of the buttons 612. Each return member 640 further comprises an actuator 646 that is configured to transfer a force applied to a corresponding button 612 to a particular location on the light guide assembly 650. The fingers 644 may be made of a deflectable, resilient material, such as plastic or the like. The actuators 646 may be made of a resilient material, such as rubber or the like.

The thermostat 600 may include one or more button retainers 634 that are configured to attach to corresponding ones of the buttons 612, and that are configured to align respective outer surfaces 612*a* of the buttons 612 relative to one another and relative to the front surface 601 of the faceplate 602, for example such that the outer surfaces 612*a* of the buttons 612 are substantially coplanar with the front surface 601 of the faceplate 602 when the buttons 612 are in respective rest positions. Each button retainer 634 may define a first end 633 that may be referred to as an upper end of the button retainer 634, and an opposed second end 635 that may be referred to as a lower end of the button retainer 634. The button retainers 634 may be elongate between the first and second ends 633, 635. As shown, each button 612 may include two pairs of posts 611 that extend in a rearward direction from the button 612. The first and second ends 633, 635 of each button retainer 634 may be configured to attach to one of the pair of posts 611 of a corresponding one of the buttons 612.

Figure 15:
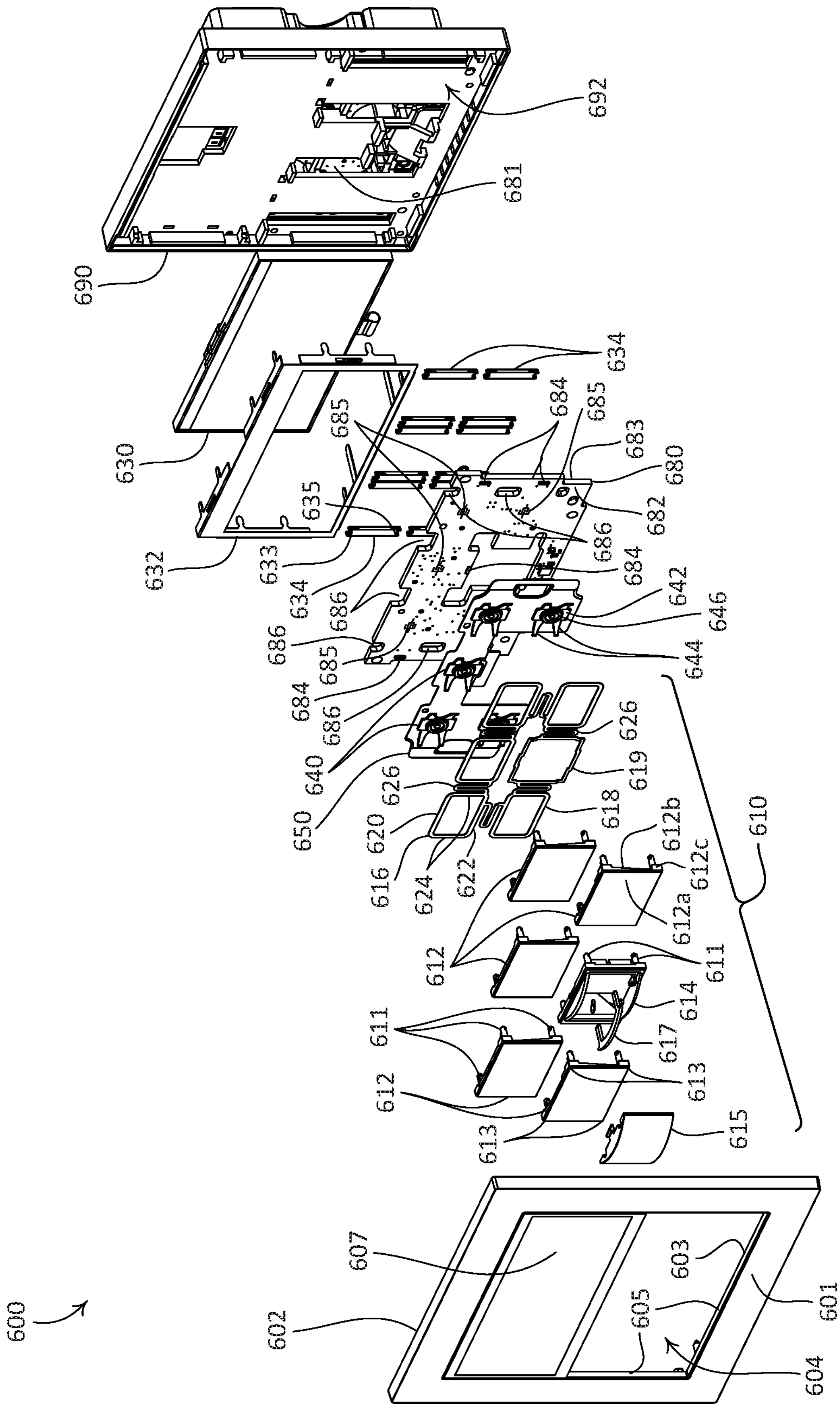
FIG. 15 is a front-facing exploded view of the example control device illustrated in FIG. 14A.
Figure 16:
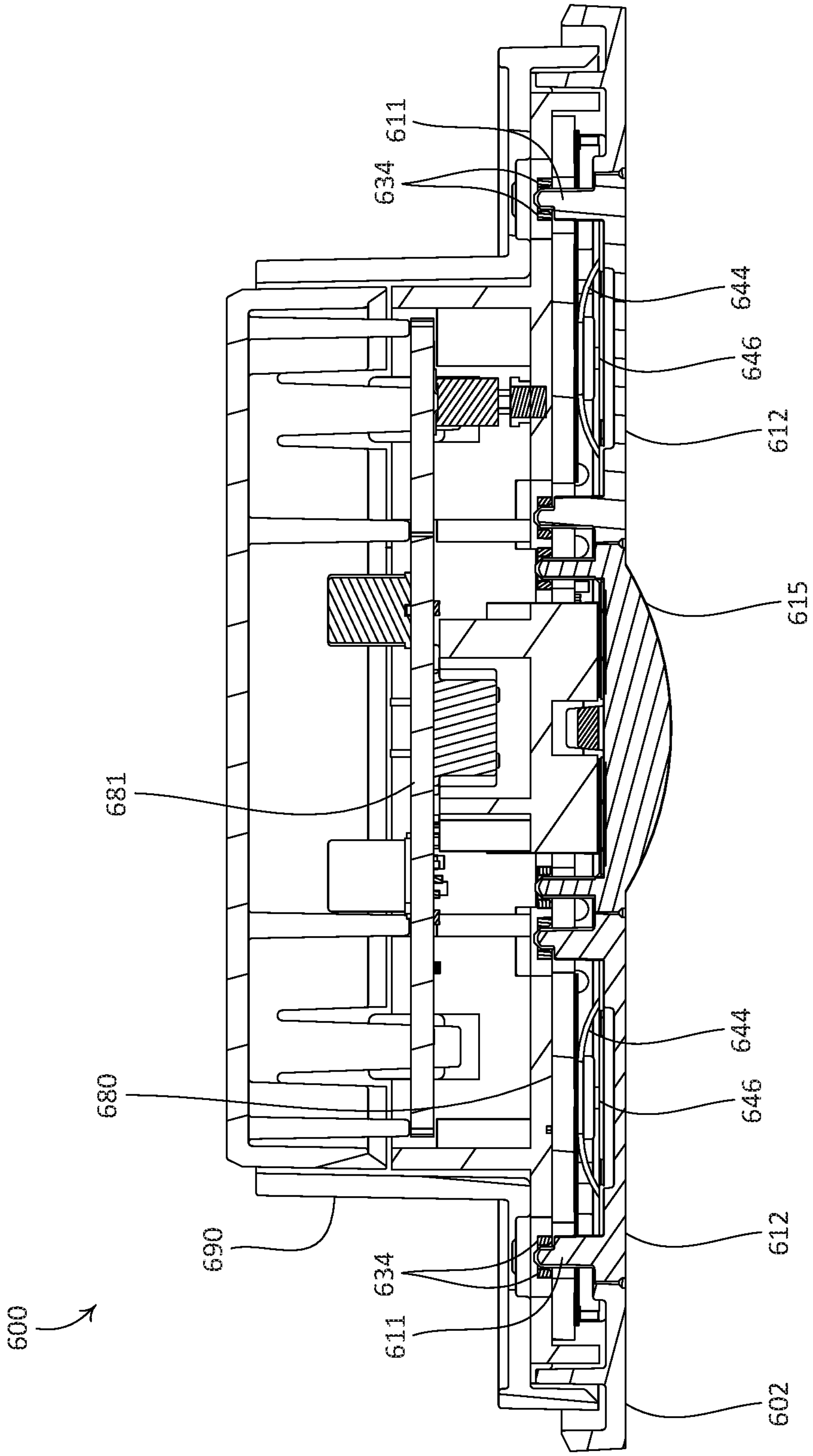
FIG. 16 is a top section view of the example control device illustrated in FIG. 14A.

As depicted in FIG. 15, the first PCB 680 may be located between the buttons 612 and the button retainers 634. The first PCB 680 may define a plurality of apertures 686 that extend therethrough, each aperture 686 configured to receive one or more posts 611. For example, in an assembled configuration of the thermostat 600, each pair of posts 611 may be disposed in a corresponding aperture 686 of the first PCB 680, and may be attached to a corresponding one of the button retainers 634. The posts 611 and button retainers 634 may be configured such that, when the buttons 612 are biased into respective rest positions by corresponding ones of the return member 640, the button retainers 634 abut a rear surface 683 of the first PCB 680, thereby aligning the outer surfaces 612*a* of the buttons 612 relative to one another and relative to the front surface 601 of the faceplate 602.

The light guide assembly 650 may be configured to disperse light emitted by the plurality of LEDs 684. The light guide assembly 650 may be constructed of similar components to those of the light guide assembly 150 of the keypad 100. For example, the light guide assembly 650 may include a light guide film layer (not shown), one or more reflector strips (not shown), a carrier layer (not shown) that defines a front surface and an opposed rear surface, and a spacer layer (not shown). The light guide assembly 650 may include a plurality of force concentrators (not shown) that are attached to the front surface of the carrier layer, and may include a plurality of electrical shorting pads (not shown) that are attached to the rear surface of the carrier layer. The force concentrators and electrical shorting pads may be aligned with corresponding ones of the buttons 612.

The first PCB 680 may have one or more open circuit pads 685 (only four of five are shown) disposed thereon, for example on the front surface 682 of the first PCB 680. Each open circuit pad 685 may include, for example, a plurality of first electrical trace fingers and a plurality of second electrical trace fingers. The pluralities of first and second electrical trace fingers may be interleaved with respect to each other, such that a conductive element (e.g., an electrical shorting pad of the light guide assembly 650) that makes contact with at least one first electrical trace finger of the plurality of first electrical trace fingers and at least one first electrical trace finger of the plurality of second electrical trace fingers may close the corresponding open circuit defined the open circuit pad 685. Each open circuit pad 685 may be aligned with one of the electrical shorting pads of the light guide assembly 650, such that the electrical shorting pad makes contact with the open circuit pad 685 when a corresponding one of the buttons 612 is depressed. Each open circuit pad 685, when closed by a corresponding electrical shorting pad, may correspond to a command for execution by a temperature regulation appliance that is controlled by the thermostat 600.

Each electrical shorting pad of the light guide assembly 650 may be dome shaped, and may define a diameter that is larger (e.g., slightly larger) than a corresponding open circuit pad 685. The electrical shorting pads of the light guide assembly 650 may be oriented such that a convex interior of each electrical shorting pad faces rearward, toward the first PCB 680. When a button 612 of the thermostat 600 is depressed, the dome of a corresponding electrical shorting pad of the light guide assembly 650 may resiliently deflect, causing the electrical shorting pad to make electrical contact with a corresponding open circuit pad 685 on the first PCB 680. Each electrical shorting pad of the light guide assembly 650 may be configured to provide feedback indicative of operation of the corresponding button 612. For example, each electrical shorting pad of the light guide assembly 650 may produce an audible and/or tactile click when depressed, and/or when deflecting back to a relaxed state (e.g., after the button 612 is depressed and pressure is subsequently released from the button 612). The electrical shorting pads of the light guide assembly 650 may be made of any suitable material, such as metal.

The housing 690 may be configured to be attached to a structure, such as a structure within an interior wall of a building. The housing 690 and the faceplate 602 may be configured such that the faceplate 602 is removable attachable to the housing 690. The housing 690 may be made of any suitable material, such as plastic.

The housing 690 may be configured to at least partially receive one or more components of the thermostat 600. For example, as shown, the housing 690 defines a void 692 that is configured to at least partially receive the first PCB 680, the second PCB 681, the light guide assembly 650, the return members 640, the display screen 630, and the button assembly 610. The first PCB 680, the second PCB 681, and the light guide assembly 650 may be configured to be secured to the housing 690. The housing 690 may be configured to receive respective portions of the button assembly 610, such that the button assembly 610 is not attached to the housing 690 but is floatingly supported by the housing 690.

When the thermostat 600 is in an assembled configuration, the button assembly 610 may be captured between the faceplate 602 and the housing 690 such that the button carrier 616 is not constrained from moving in a plane that extends parallel to the front and rear surfaces 601, 603 of the faceplate 102. For example, when the faceplate 602 is attached to the housing 690 the button carrier 616, and thus the buttons 612, may move laterally (e.g., side to side) and/or longitudinally (e.g., up and down) within the opening 604 of the faceplate 602. Lateral and/or longitudinal movement of the buttons 612 within the opening 604, and thus of the button carrier 616, may be constrained, for example, by the inner surfaces 605 of the opening 604 and/or by respective dimensions of one or more of the apertures 686 relative to the posts 611 of one or more corresponding buttons 612. For example, the button carrier 616 may exhibit more freedom to move laterally and/or longitudinally within the opening 604 as the dimensions of one or more of the apertures 686 is increased relative to the posts 611 of corresponding buttons 612. In this regard, when the button assembly 610 is captured between the housing 690 and the faceplate 602, the buttons 612 may be moveable within the opening 604 along a direction that extends parallel to the front and rear surfaces 601, 603 of the faceplate 602.

Additionally, when the button assembly 610 is captured between the faceplate 602 and the housing 690, the button carrier 616 abuts the rear surface 603 of the faceplate 602 and may be constrained from moving along a direction that extends perpendicular to the front and rear surfaces 601, 603 of the faceplate 102. In this regard, when the button assembly 610 is captured between the housing 690 and the faceplate 602, the button carrier 616 may be prevented from moving inward relative to the housing 690.

In an example of operation of the thermostat 600, when a particular one of the buttons 612 is depressed (e.g., under a force applied to the button 612 by a user of the thermostat 600), the fingers 644 of a corresponding return member 640 may deflect toward the light guide assembly 650, and the actuator 646 of the return member 640 may be biased inward. The actuator 646 may abut a corresponding force concentrator enclosed within the light guide assembly 650, and may transfer the applied force to the force concentrator. The force transferred to the force concentrator may cause a corresponding one of the electrical shorting pads to make contact with a corresponding one of the open circuit pads 685 on the first PCB 680, which may close a circuit associated with the open circuit pad 685. The thermostat 600 may, in response to the circuit associated with the open circuit pad 685 being closed, transmit a command to a temperature regulation appliance, for example via the communication link. When the force applied to the button 612 is removed (e.g., at the completion of depression of the button 612), the fingers 644 may resiliently return to a non-deflected (e.g., relaxed) state, and may bias the corresponding button 612 outward to a respective rest position.

It should be appreciated that the example keypad 100 and thermostat 600 control devices are not limited to the configurations illustrated and described herein, and that components and/or features of one example control device may be implemented in other example control devices. For example, the button retainers 634 of the thermostat 600 can be implemented in a control device that is configured for use in a load control system, such as the keypad 100. In another example, the keypad 100 may alternatively be configured with the return members 640 of the thermostat 600, and the thermostat 600 may be alternatively configured with the return members 140 of the keypad 100, and so on. It should further be appreciated that the features of the keypad 100 and the thermostat 600 are not limited to implementations using the illustrated faceplate and adapter geometries. For example, the features of the keypad 100 may alternatively be implemented with faceplate and/or adapter geometries that may be suitable for installation with European style electrical wallboxes. It should further still be appreciated that the example keypad 100 may be configured as a load control device, in addition to or in lieu of being configured to control a load control device.

The invention claimed is:

1. A wallbox mountable control apparatus, comprising:
- a button assembly that includes:
  - a plurality of buttons; and
  - a button carrier coupled about at least a portion of a perimeter of each of the plurality of buttons;
- a control module that includes:
  - a plurality of light source pairs, each of the plurality of light source pairs associated with a respective one of the plurality of buttons;
    - wherein each light source pair includes a first light source and a second light source; and
    - wherein, for each light source pair, the first light source and the second light source are disposed proximate opposing sides of one of the plurality of buttons; and
- a light guide layer disposed between the button assembly and the control module, the light guide layer including:
  - a first reflector strip disposed along at least a portion of a first edge of the light guide layer, the first edge of the light guide layer disposed proximate the first light source included in each of the plurality of light source pairs;
  - a second reflector strip disposed along at least a portion of a second edge of the light guide layer, the second edge of the light guide layer disposed proximate the second light source included in each of the plurality of light source pairs.

2. The wallbox mountable control apparatus of claim 1 wherein each of the plurality of buttons includes translucent material and a metal laminate having icons formed therethrough.

3. The wallbox mountable control apparatus of claim 1 wherein each of the plurality of buttons includes a translucent material and a non-light transmissive coating having icons formed therein.

4. The wallbox mountable control apparatus of claim 1 wherein each of the plurality of light source pairs comprise a pair of light-emitting diodes.

5. The wallbox mountable control apparatus of claim 1, further comprising:
- a wallbox mountable housing disposed at least partially about the control module; and
- a faceplate couplable to the wallbox mountable housing;
- wherein a front surface of each of the plurality of buttons is disposed flush with a front surface of the faceplate when the faceplate is coupled to the wallbox mountable housing.

6. The wallbox mountable control apparatus of claim 1 wherein the control module further comprises a display device.

7. The wallbox mountable control apparatus of claim 1 wherein the control module further comprises, for each of at least some of the plurality of buttons, a plurality of normally open electrical contacts.

8. The wallbox mountable control apparatus of claim 7 further comprising a plurality of force concentrators each of the plurality of force concentrators disposed between the light guide layer and a respective one of the plurality of normally open electrical contacts;
- wherein each of the plurality of force concentrators is associated with a respective one of the plurality of buttons; and
- wherein each force concentrator causes a closure of one of the normally open electrical contacts responsive to a displacement of one of the plurality of buttons.

9. The wallbox mountable control apparatus of claim 1 wherein the light guide layer further comprises a plurality of light dispersion regions;
- wherein each of the plurality of light dispersion regions is associated with a respective one of the plurality of buttons.

10. The wallbox mountable control apparatus of claim 9 wherein each of the plurality of light dispersion regions is separated by a gap from at least one neighboring light dispersion region.

11. The wallbox mountable control apparatus of claim 10 wherein each of the plurality of light dispersion regions extend continuously from the first edge of the light guide layer to the second edge of the light guide layer.

12. A wallbox mountable control device, comprising:

a button assembly that includes:

a plurality of buttons; and a resilient button carrier coupled about at least a portion of a perimeter of each of the plurality of buttons;

a control module that includes, for each button included in the plurality of buttons:

a first light source and a second light source to back-light the respective button; and at least one normally open set of electrical contacts that close upon actuation of the respective button; and a light guide layer disposed between the button assembly and the control module, that includes, for each button included in the plurality of buttons:

a light dispersion region separated by a gap from one or more adjacent light dispersion regions; and at least one reflector strip disposed along a first edge of the light guide layer;

wherein the first light source is disposed proximate a first edge of the light guide layer; and wherein the second light source is disposed proximate a second edge of the light guide layer, the second edge of the light guide layer disposed transversely across a light dispersion region.

13. The wallbox mountable control device of claim 12 wherein the light guide layer further comprises, for each button included in the plurality of buttons:

a first reflector strip disposed proximate the first light source, the first reflector strip to reflect at least a portion of light emitted by the first light source into a first side of the light dispersion region; and a second reflector strip disposed proximate the second light source, the second reflector strip to reflect at least a portion of light emitted by the second light source into a second side the light dispersion region.

14. The wallbox mountable control device of claim 12 further comprising, for each of the buttons included in the plurality of buttons, a force concentrator disposed between the light dispersion region of the light guide layer and the at least one normally open electrical contact;

wherein the force concentrator to cause a closure of the at least one normally open electrical contact responsive to a displacement of the respective button.

15. The wallbox mountable control apparatus of claim 12 wherein each of the plurality of buttons includes translucent material and a metal laminate having icons formed there-through.

16. The wallbox mountable control apparatus of claim 12 wherein each of the plurality of buttons includes a translucent material and a non-light transmissive coating having icons formed therein.

17. The wallbox mountable control apparatus of claim 12 wherein the control module further comprises a display device.

18. The wallbox mountable control apparatus of claim 12 further comprising a wallbox mountable housing disposed about the control module.

19. The wallbox mountable control apparatus of claim 18, further comprising a faceplate couplable to the wallbox mountable housing;

wherein the faceplate comprises a member having a front surface; and wherein a front surface of each of the plurality of buttons is disposed flush with the front surface of the faceplate when the faceplate is coupled to the wallbox mountable housing.

* * * * *